United States Patent
Gan et al.

(10) Patent No.: US 11,438,204 B2
(45) Date of Patent: Sep. 6, 2022

(54) PHYSICAL LAYER CONVERGENCE PROCEDURE PROTOCOL DATA UNIT COMMUNICATION METHOD AND RELATED APPARATUS

(71) Applicant: Huawei Technologies Co., Ltd., Shenzhen (CN)

(72) Inventors: Ming Gan, Shenzhen (CN); Jia Jia, Shenzhen (CN); Yunbo Li, Shenzhen (CN); Peter Loc, Cupertino, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/164,185

(22) Filed: Feb. 1, 2021

(65) Prior Publication Data

US 2021/0160113 A1 May 27, 2021

Related U.S. Application Data

(63) Continuation of application No. PCT/CN2019/096886, filed on Jul. 19, 2019.

(30) Foreign Application Priority Data

Aug. 2, 2018 (CN) .......................... 201810874155.6

(51) Int. Cl.
*H04L 27/26* (2006.01)
*H04L 5/00* (2006.01)
(Continued)

(52) U.S. Cl.
CPC ........ *H04L 27/2613* (2013.01); *H04L 5/0007* (2013.01); *H04L 5/0053* (2013.01);
(Continued)

(58) Field of Classification Search
CPC .................................................... H04W 84/12
See application file for complete search history.

(56) References Cited

U.S. PATENT DOCUMENTS

| | | |
|---|---|---|
| 9,497,000 B2 | 11/2016 | Choi et al. |
| 2017/0041928 A1 | 2/2017 | Park et al. |

(Continued)

FOREIGN PATENT DOCUMENTS

| | | |
|---|---|---|
| CN | 106797278 A | 5/2017 |
| CN | 106849962 A | 6/2017 |

(Continued)

OTHER PUBLICATIONS

IEEE, "Part 11: Wireless LAN Medium Access Control(MAC) and Physical Layer (PHY) Specifications", IEEE Standard for Information technology, Telecommunications and information exchange between systems, Local and metropolitan area networks, Specific requirements, IEEE Std 802.11-2016, 3534 pages.

(Continued)

*Primary Examiner* — Kevin Kim
(74) *Attorney, Agent, or Firm* — Slater Matsil, LLP

(57) ABSTRACT

This application provides a physical layer convergence procedure protocol data unit communication method and a related apparatus. The method includes: receiving, by a receiving apparatus, a physical layer convergence procedure protocol data unit PPDU sent by a sending apparatus, where the PPDU includes synchronization adjustment indication information and a data field, and the synchronization adjustment indication information and the data field are sent in a bandwidth less than 20 MHz; and performing, by the receiving apparatus, time synchronization and automatic gain control AGC on the data field based on the synchronization adjustment indication information. According to this solution, the receiving apparatus can perform, by using the synchronization adjustment indication information, time (Continued)

synchronization and automatic gain control AGC on the PPDU transmitted in a narrow bandwidth.

28 Claims, 6 Drawing Sheets

(51) Int. Cl.
  *H04W 52/54* (2009.01)
  *H04W 72/04* (2009.01)
  *H04W 84/12* (2009.01)

(52) U.S. Cl.
  CPC ....... *H04W 52/54* (2013.01); *H04W 72/0453* (2013.01); *H04W 84/12* (2013.01)

(56) References Cited

U.S. PATENT DOCUMENTS

| | | |
|---|---|---|
| 2017/0265129 A1 | 9/2017 | Chen et al. |
| 2017/0303208 A1 | 10/2017 | Suh et al. |
| 2018/0302255 A1* | 10/2018 | Verma .................. H04B 7/2662 |
| 2019/0191376 A1* | 6/2019 | Kim .................. H04W 52/0229 |

FOREIGN PATENT DOCUMENTS

| | | |
|---|---|---|
| CN | 107455002 A | 12/2017 |
| WO | 2013122377 A1 | 8/2013 |
| WO | 2018031134 A1 | 2/2018 |
| WO | 2018084689 A1 | 5/2018 |

OTHER PUBLICATIONS

IEEE, "IEEE P802.11ax/D2.2, Draft Standard for Information technology, Telecommunications and information exchange between systems Local and metropolitan area networks, Specific requirements, Part 11: Wireless LAN Medium Access Control (MAC) and Physical Layer (PHY) Specifications, Amendment 6: Enhancements for High Efficiency WLAN", Feb. 2018, 620 pages.

IEEE P802.11ah/D8.0, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation, Prepared by the 802.11 Working Group of the LAN/MAN Standards Committee of the IEEE Computer Society, Apr. 2016, 655 pages. New York, New York, USA.

* cited by examiner

PHYSICAL LAYER CONVERGENCE PROCEDURE PROTOCOL DATA UNIT COMMUNICATION METHOD AND RELATED APPARATUS

CROSS-REFERENCE TO RELATED APPLICATIONS

This application is a continuation of International Application No. PCT/CN2019/096886, filed on Jul. 19, 2019, which claims priority to Chinese Patent Application No. 201810874155.6, filed on Aug. 2, 2018. The disclosures of the aforementioned applications are hereby incorporated by reference in their entireties.

TECHNICAL FIELD

This application relates to the field of communications technologies, and in particular, to a physical layer convergence procedure protocol data unit communication method and a related apparatus.

BACKGROUND

With development of the era, the internet of things (IoT) is widely used in scenarios such as a smart home, vehicle-mounted communication, and a smart city. IoT communication has features such as a low speed, low power, low costs, and a long distance. Currently, relatively widely used IoT networks mainly include the mobile-cellular-communication-based narrowband internet of things (NB-IoT) and the proprietary-protocol-based long range internet of things (LoRa). Both the NB-IoT and the LoRa have features such as low power consumption, wide coverage, and low costs. However, the NB-IoT is supported by an extension to cellular network base stations and is easy to deploy. As a product of the proprietary protocol, the LoRa requires an additional gateway to complete final data exchange. Therefore, LoRa deployment is more complex than NB-IoT deployment.

In addition, the NB-IoT is based on a cellular network and uses a non-free spectrum; and consequently, usage costs of a user are increased. For example, if the NB-IoT is widely used in a smart home and intelligent manufacturing, consumption costs of ordinary families and small and medium-sized enterprises will be increased significantly. Although the LoRa uses a free spectrum, the LoRa cannot interconnect with an existing widely used wireless local area network (WLAN) product that is also applicable to the free spectrum. Therefore, an additional LoRa module and an additional protocol interaction gateway need to be purchased, resulting in difficulties in deployment for the ordinary families and the small and medium-sized enterprises.

Neither the NB-IoT nor the LoRa can provide a synchronization adjustment function and an automatic gain control adjustment function for data transmitted in a narrowband (less than 20 MHz).

SUMMARY

This application provides a physical layer convergence procedure protocol data unit communication method and a related apparatus, to provide a synchronization sequence in an IoT network, so that time synchronization and automatic gain control (AGC) adjustment can be supported on an IoT data part in a bandwidth less than 20 MHz.

According to a first aspect, a physical layer convergence procedure protocol data unit communication method is provided. The method includes: receiving, by a receiving apparatus (for example, a STA), a physical layer convergence procedure protocol data unit PPDU sent by a sending apparatus (for example, an AP), where this corresponds to a downlink communication process, the PPDU includes synchronization adjustment indication information and a data field, and the sending apparatus sends the synchronization adjustment indication information and the data field in a bandwidth less than 20 MHz; and receiving, by the receiving apparatus, the PPDU, and performing time synchronization and automatic gain control AGC on the data field in the PPDU based on the synchronization adjustment indication information in the PPDU.

With reference to the first aspect, in an optional implementation, the PPDU further includes a legacy preamble L-preamble, and the L-preamble is sent in a bandwidth in a unit of 20 MHz.

According to a second aspect, a physical layer convergence procedure protocol data unit communication method is provided. The method includes: sending, by a sending apparatus (for example, an AP), a physical layer convergence procedure protocol data unit PPDU, where this corresponds to a downlink communication process, the PPDU includes synchronization adjustment indication information and a data field, and the sending apparatus sends the synchronization adjustment indication information and the data field in a bandwidth less than 20 MHz, so that a receiving apparatus (for example, a STA) performs time synchronization and automatic gain control AGC on the data field in the PPDU based on the synchronization adjustment indication information in the PPDU.

According to this implementation, the receiving apparatus extracts and processes the synchronization adjustment indication information in the received PPDU, so that time synchronization and AGC adjustment can be performed on the data field in the PPDU in the bandwidth less than 20 MHz.

With reference to the second aspect, in an optional implementation, the PPDU further includes a legacy preamble L-preamble, and the L-preamble is sent in a bandwidth in a unit of 20 MHz. For example, the L-preamble may be sent in a bandwidth of 20 MHz. For another example, the L-preamble may alternatively be sent in a bandwidth of 40 MHz.

According to this implementation, the sending apparatus can communicate not only with a broadband receiving apparatus but also with a receiving apparatus that occupies a relatively narrow bandwidth, thereby ensuring good compatibility. In addition, a probability of collision can be effectively avoided, thereby improving performance of a network system.

According to a third aspect, a physical layer convergence procedure protocol data unit communication method is provided. The method includes: sending, by a sending apparatus (for example, a STA), a PPDU to a receiving apparatus (for example, an AP), where this corresponds to an uplink communication process, the PPDU includes synchronization adjustment indication information and a data field, and the sending apparatus sends the synchronization adjustment indication information and the data field in a bandwidth less than 20 MHz, where the synchronization adjustment indication information is used by the receiving apparatus to perform time synchronization and automatic gain control AGC on the data field.

According to a fourth aspect, a physical layer convergence procedure protocol data unit communication method is provided. The method includes: receiving, by a receiving apparatus (for example, an AP), a PPDU sent by a sending apparatus (for example, a STA), where this corresponds to an uplink communication process, the PPDU includes synchronization adjustment indication information and a data field, and the synchronization adjustment indication information and the data field are sent in a bandwidth less than 20 MHz; and performing, by the receiving apparatus, time synchronization and automatic gain control AGC on the data field based on the synchronization adjustment indication information.

According to this implementation, the sending apparatus sends, to the receiving apparatus in the bandwidth less than 20 MHz, the PPDU including the synchronization adjustment indication information and the data field, so that the receiving apparatus extracts and processes the synchronization adjustment indication information in the received PPDU, so that time synchronization and AGC adjustment can be performed on the data field in the PPDU in the bandwidth less than 20 MHz.

With reference to the method according to any one of the first aspect to the fourth aspect, in an optional implementation, the bandwidth less than 20 MHz includes k subcarriers in frequency domain, the synchronization adjustment indication information includes information obtained after inverse fast Fourier transform IFFT is performed on sequence values of the k subcarriers in frequency domain, and the sequence values of the k subcarriers are a subset of sequence values of a legacy short training sequence L-STF in the L-preamble in frequency domain.

According to this implementation, a design idea of the L-STF in the prior art can be better used. Because the L-STF has a good time synchronization function and a good AGC adjustment function, the synchronization adjustment indication information designed based on the L-STF also has similar functions, so that time synchronization and AGC adjustment can be performed on the data field in the PPDU in the bandwidth less than 20 MHz.

With reference to the method according to any one of the first aspect to the fourth aspect, in an optional implementation, the sequence values of the k subcarriers in frequency domain include sequence values IoT-S1$_{-13,13}$ of 27 subcarriers in frequency domain.

With reference to the method according to any one of the first aspect to the fourth aspect, in an optional implementation, the sequence values of the k subcarriers in frequency domain further include sequence values of five sideband subcarriers in frequency domain, the sequence values of the sideband subcarriers are 0, and two ends of IoT-S1$_{-13,13}$ respectively include a sideband subcarriers in the five sideband subcarriers and b sideband subcarriers in the five sideband subcarriers, where a and b are positive integers, and a+b=5.

The sequence values of the sideband subcarriers whose values are 0 are added to the two ends of IoT-S1$_{-13,13}$, so that the sideband subcarriers whose values are 0 serve as a guard spacing, thereby avoiding interference from adjacent channels. In addition, the sequence values of the five sideband subcarriers whose values are 0 are added to IoT-S1$_{-13,13}$, to form a 32-point frequency domain sequence, so that 32-point IFFT can be performed.

With reference to the method according to any one of the first aspect to the fourth aspect, in an optional implementation, IoT-S1$_{-13,13}$=
$\sqrt{13/6}\{0,1+j,0,-1-j,0,1+j,0,-1-j,0,-1-j,0,1+j,0,0,0,$
$-1-j,0,-1-j,0,1+j,0,1+j,0,1+j,0,1+j,0\}$.

Some (two) values 0 that appear cyclically are removed in a fixed spacing from S$_{-26,26}$ corresponding to the L-STF, to obtain IoT-S1$_{-13,13}$, so that a PAPR feature of IoT-S1$_{-13,13}$ is consistent with that of the L-STF.

With reference to the method according to any one of the first aspect to the fourth aspect, in an optional implementation, IoT-S1$_{-13,13}$=
$\sqrt{13/6}\{0,-1-j,0,0,0,-1-j,0,0,0,1+j,0,0,0,0,0,0,0,-1-j,$
$0,0,0,-1-j,0,0,0,1+j,0\}$.

First 13 sequence values and last 13 sequence values are removed from S$_{-26,26}$ corresponding to the L-STF, and only middle 27 sequence values are retained, to obtain IoT-S1$_{-13,13}$, so that a periodicity feature of IoT-S1$_{-13,13}$ is consistent with that of the L-STF in time domain.

With reference to the method according to any one of the first aspect to the fourth aspect, in an optional implementation, the bandwidth less than 20 MHz includes k subcarriers in frequency domain, the synchronization adjustment indication information includes information obtained after IFFT is performed on sequence values of the k subcarriers in frequency domain, the sequence values of the k subcarriers in frequency domain include IoT-S1$_{-13,13}$, and IoT-S1$_{-13,13}$ is one of the following sequences:
$\sqrt{13/6}\{0,1+j,0,0,0,1+j,0,0,0,-1-j,0,0,0,0,0,0,0,-1$
$-j,0,0,0,1+j,0,0,0,-1-j,0\}$;
$\sqrt{13/6}\{0,1+j,0,0,0,-1-j,0,0,0,1+j,0,0,0,0,0,0,0,1+j,0,0,0,$
$-1-j,0,0,0,-1-j,0\}$;
$\sqrt{13/6}\{0,1+j,0,0,0,-1-j,0,0,0,1+j,0,0,0,0,0,0,0,-1-j,0,0,0,$
$-1-j,0,0,0,1+j,0\}$;
$\sqrt{13/6}\{0,1+j,0,0,0,-1-j,0,0,0,-1-j,0,0,0,0,0,0,0,1+j,0,0,0,$
$-1-j,0,0,0,1+j,0\}$;
$\sqrt{13/6}\{0,-1-j,0,0,0,1+j,0,0,0,1+j,0,0,0,0,0,0,0,-1-j,0,0,0,$
$1+j,0,0,0,-1-j,0\}$;
$\sqrt{13/6}\{0,-1-j,0,0,0,1+j,0,0,0,-1-j,0,0,0,0,0,0,0,1+j,0,$
$0,0,1+j,0,0,0,-1-j,0\}$;
$\sqrt{13/6}\{0,-1-j,0,0,0,1+j,0,0,0,-1-j,0,0,0,0,0,0,0,-1-j,0,$
$0,0,1+j,0,0,0,1+j,0\}$; or
$\sqrt{13/6}\{0,-1-j,0,0,0,-1-j,0,0,0,1+j,0,0,0,0,0,0,0,1+j,0,$
$0,0,-1-j,0,0,0,1+j,0\}$.

According to this implementation, the foregoing sequences are obtained based on different combinations of values at a same nonzero position. Absolute values of first peak-to-second peak ratios of these sequences are relatively large, and PAPR values are relatively small, so that relatively good performance is ensured.

With reference to the method according to any one of the first aspect to the fourth aspect, in an optional implementation, the sequence values of the k subcarriers in frequency domain include sequence values IoT-S2$_{-26,26}$ of 53 subcarriers in frequency domain.

With reference to the method according to any one of the first aspect to the fourth aspect, in an optional implementation, the sequence values of the k subcarriers in frequency domain further include sequence values of 11 sideband subcarriers in frequency domain, the sequence values of the sideband subcarriers are 0, and two ends of IoT-S2$_{-26,26}$ respectively include a1 sideband subcarriers in the 11 sideband subcarriers and b1 sideband subcarriers in the 11 sideband subcarriers, where a1 and b1 are positive integers, and a1+b1=11.

The sequence values of the sideband subcarriers whose values are 0 are added to the two ends of IoT-S2$_{-26,26}$, so that the sideband subcarriers whose values are 0 serve as a guard spacing, thereby avoiding interference from adjacent channels. In addition, the sequence values of the 11 sideband subcarriers whose values are 0 are added to IoT−S2$_{−26,26}$, to form a 64-point frequency domain sequence, so that 64-point IFFT can be performed.

With reference to the method according to any one of the first aspect to the fourth aspect, in an optional implementation, IoT−S2$_{−26,26}$= $\sqrt{13/6}${0,0,1+j,0,0,0,−1−j,0,0,0,1+j,0,0,0,−1−j,0,0,0, −1−j,0,0,0,1+j,0,0,0,0,0,0,−1−j,0,0,0,−1−j,0,0,0,1+j,0,0,0, 1+j,0,0,0,1+j,0,0,0,1+j,0,0}.

Values of a frequency domain sequence similar to S$_{−26,26}$ corresponding to the L-STF are used, so that a PAPR feature of IoT−S2$_{−26,26}$ is consistent with that of the L-STF, and a periodic feature of IoT−S2$_{−26,26}$ is consistent with that of the L-STF in time domain.

With reference to the method according to any one of the first aspect to the fourth aspect, in an optional implementation, the sequence values of the k subcarriers in frequency domain include sequence values IoT−S3$_{−6,6}$ of 13 subcarriers in frequency domain.

With reference to the method according to any one of the first aspect to the fourth aspect, in an optional implementation, the sequence values of the k subcarriers in frequency domain further include sequence values of three sideband subcarriers in frequency domain, the sequence values of the sideband subcarriers are 0, and two ends of IoT−S3$_{−6,6}$ respectively include a2 sideband subcarriers in the three sideband subcarriers and b2 sideband subcarriers in the sideband subcarriers, where a2 and b2 are positive integers, and a2+b2=3.

The sequence values of the sideband subcarriers whose values are 0 are added to the two ends of IoT−S3$_{−6,6}$, so that the sideband subcarriers whose values are 0 serve as a guard spacing, thereby avoiding interference from adjacent channels. In addition, the sequence values of the three sideband subcarriers whose values are 0 are added to IoT−S3$_{−6,6}$, to form a 16-point frequency domain sequence, so that 16-point IFFT can be performed.

With reference to the method according to any one of the first aspect to the fourth aspect, in an optional implementation, IoT−S3$_{−6,6}$= $\sqrt{13/6}${1+j,−1−j,1+j,−1−j,−1−j,1+j,0,−1−j,−1−j,1+j,1+j, 1+j,1+j}.

Some (three) values 0 that appear cyclically are removed in a fixed spacing from S$_{−26,26}$ corresponding to the L-STF, to obtain IoT−S3$_{−6,6}$, so that a PAPR feature of IoT−S3$_{−6,6}$ is consistent with that of the L-STF.

According to a fifth aspect, a communications apparatus for a physical layer convergence procedure protocol data unit is provided. The apparatus is used in a station side. The apparatus may be a station STA, or a chip in a station. The apparatus can implement a function of the station STA in the first aspect or the third aspect. The function may be implemented by hardware, or may be implemented by hardware executing corresponding software. The hardware or software includes one or more units corresponding to the foregoing function.

In a possible design, when the communications apparatus is the station, the communications apparatus includes a processing module and a transceiver module. The processing module may be, for example, a processor. The transceiver module may be, for example, a transceiver. The transceiver may include a radio frequency circuit and a baseband circuit. The transceiver module is configured to support communication between the station and an access point AP or communication between the station and another station. In an example, the transceiver module may further include a sending module and a receiving module. For example, the receiving module is configured to receive a physical layer convergence procedure protocol data unit PPDU sent by a sending apparatus (for example, an AP), where the PPDU includes synchronization adjustment indication information and a data field, and the synchronization adjustment indication information and the data field are sent in a bandwidth less than 20 MHz. The processing module is configured to perform time synchronization and automatic gain control AGC on the data field based on the synchronization adjustment indication information. Optionally, the apparatus may further include a memory. The memory is configured to be coupled to the processor, and stores a program instruction and data that are necessary for the communications apparatus.

In another possible design, the apparatus includes a processor, a baseband circuit, a radio frequency circuit, and an antenna. The processor is configured to control functions of the circuits. The baseband circuit, the radio frequency circuit, and the antenna are configured to indicate communication between the station and another node. For example, in downlink communication, the radio frequency circuit may perform processing such as digital conversion, filtering, amplification, and down-conversion on a physical layer convergence procedure protocol data unit that is sent by an access point and that is received through the antenna, and then the baseband circuit performs decoding and protocol-based decapsulation, to obtain synchronization adjustment indication information. Optionally, the apparatus further includes a memory. The memory stores a program instruction and data that are necessary for the station. In uplink communication, the baseband circuit generates a physical layer convergence procedure protocol data unit that carries synchronization adjustment indication information, the radio frequency circuit performs processing such as analog conversion, filtering, amplification, and up-conversion, and then the antenna sends the physical layer convergence procedure protocol data unit to an access point AP in a bandwidth less than 20 MHz.

In still another possible implementation, the apparatus includes a processor and a modem. The processor may be configured to run an instruction or an operating system, to control a function of the station. The modem may perform encapsulation, encoding/decoding, modulation/demodulation, equalization, and the like on data according to a protocol to generate an uplink PPDU that carries synchronization adjustment indication information, to support the station in performing a corresponding function in the first aspect or the third aspect. The modem may alternatively be configured to receive a downlink PPDU that carries synchronization adjustment indication information and that is sent by an AP, to perform time synchronization and automatic gain control AGC on a data field based on the synchronization adjustment indication information.

In still another possible implementation, when the apparatus is the chip in the station, the chip includes a processing module and a transceiver module. The processing module may be, for example, a processor. The processor may be configured to perform processing such as filtering, demodulation, power amplification, and decoding on a data packet that carries synchronization adjustment indication information and that is received through the transceiver module. The transceiver module may be, for example, an input/output interface, a pin, or a circuit on the chip. The processing module may execute a computer-executable instruction stored in a storage unit, to support the station in performing a corresponding function in the first aspect or the third aspect. Optionally, the storage unit may be a storage unit in the chip, such as a register or a cache. Alternatively, the storage unit may be a storage unit that is in the station and that is located outside the chip, such as a read-only memory (ROM for short), another type of static storage device that can store static information and an instruction, or a random access memory (RAM for short).

In still another possible implementation, the apparatus includes a processor. The processor is configured to: be coupled to a memory, read an instruction in the memory, and perform, according to the instruction, a function of the station STA in the first aspect or the third aspect. The memory may be located inside the processor, or may be located outside the processor.

According to a sixth aspect, a communications apparatus for a physical layer convergence procedure protocol data unit is provided. The apparatus is used in an access point side. The apparatus may be an access point, or a chip in an access point AP. The apparatus can implement a function of the access point AP in the second aspect or the fourth aspect. The function may be implemented by hardware, or may be implemented by hardware executing corresponding software. The hardware or software includes one or more units corresponding to the foregoing function.

In a possible design, when the communications apparatus is the AP, the communications apparatus includes a processing module and a transceiver module. The processing module may be, for example, a processor. The transceiver module may be, for example, a transceiver. The transceiver may include a radio frequency circuit and a baseband circuit. The transceiver module is configured to support communication between the access point and a station. In an example, the transceiver module may further include a sending module and a receiving module, to support the AP in performing uplink communication and downlink communication. For example, in uplink communication, the apparatus is a receiving apparatus. The receiving module may be configured to receive a physical layer convergence procedure protocol data unit PPDU sent by a sending apparatus (for example, a STA), where the PPDU includes synchronization adjustment indication information and a data field, and the synchronization adjustment indication information and the data field are sent in a bandwidth less than 20 MHz. The processing module may be configured to perform time synchronization and automatic gain control AGC on the data field based on the synchronization adjustment indication information. In downlink communication, the apparatus is a sending apparatus. The sending module may be configured to send a PPDU to a STA. Optionally, the apparatus may further include a memory. The memory is configured to be coupled to the processor, and stores a program instruction and data that are necessary for the communications apparatus.

In another possible design, the apparatus includes a processor, a baseband circuit, a radio frequency circuit, and an antenna. The processor is configured to control functions of the circuits. The baseband circuit, the radio frequency circuit, and the antenna are configured to support communication between the access point and a station. For example, in uplink communication, the apparatus is used as a receiving apparatus, and the radio frequency circuit of the apparatus may perform processing such as digital conversion, filtering, amplification, and down-conversion on a physical layer convergence procedure protocol data unit that is sent by the station and that is received through the antenna, and then the baseband circuit performs decoding and protocol-based decapsulation, to obtain synchronization adjustment indication information. Optionally, the apparatus further includes a memory. The memory stores a program instruction and data that are necessary for the station. For example, in downlink communication, the apparatus is used as a sending apparatus, the baseband circuit generates a physical layer convergence procedure protocol data unit that carries synchronization adjustment indication information, the radio frequency circuit performs processing such as analog conversion, filtering, amplification, and up-conversion, and then the antenna sends the physical layer convergence procedure protocol data unit to the access point AP in a bandwidth less than 20 MHz.

In still another possible design, the apparatus includes a processor and a modem. The processor may be configured to run an instruction or an operating system, to control a function of the access point AP. The modem may perform encapsulation, encoding/decoding, modulation/demodulation, equalization, and the like on data according to a protocol to generate a PPDU that carries synchronization adjustment indication information, to support the access point in performing a corresponding function in the second aspect or the fourth aspect. The modem may alternatively be configured to receive a PPDU that carries synchronization adjustment indication information and that is sent by a station, to perform time synchronization and automatic gain control AGC on a data field based on the synchronization adjustment indication information.

In still another possible design, when the apparatus is the chip in the access point, the chip includes a processing module and a transceiver module. The processing module may be, for example, a processor. The processor may be configured to perform processing such as filtering, demodulation, power amplification, and decoding on a data packet that carries synchronization adjustment indication information and that is received through the transceiver module. The transceiver module may be, for example, an input/output interface, a pin, or a circuit on the chip. The processing module may execute a computer-executable instruction stored in a storage unit, to support the access point in performing a corresponding function in the second aspect or the fourth aspect. Optionally, the storage unit may be a storage unit in the chip, such as a register or a cache. Alternatively, the storage unit may be a storage unit that is in the station and that is located outside the chip, such as a read-only memory (ROM for short), another type of static storage device that can store static information and an instruction, or a random access memory (RAM for short).

In still another possible implementation, the apparatus includes a processor. The processor is configured to: be coupled to a memory, read an instruction in the memory, and perform, according to the instruction, a function of the access point AP in the second aspect or the fourth aspect. The memory may be located inside the processor, or may be located outside the processor.

According to a seventh aspect, this application provides a computer-readable storage medium. The computer-readable storage medium stores an instruction, and the instruction may be executed by one or more processors in a processing circuit. When the instruction is run on a computer, the computer is enabled to perform the method according to any one of the first aspect to the fourth aspect.

According to an eighth aspect, a computer program product including an instruction is provided. When the computer program product runs on a computer, the computer is enabled to perform the method according to any one of the first aspect to the fourth aspect or the possible implementations of the first aspect to the fourth aspect. All or a part of the computer program product may be stored in a storage medium encapsulated in a processor, or may be stored in a storage medium encapsulated outside a processor.

By implementing the embodiments of this application, the receiving apparatus extracts and processes the synchronization adjustment indication information in the received PPDU, so that time synchronization and AGC adjustment can be performed on the data field in the PPDU in the bandwidth less than 20 MHz.

DETAILED DESCRIPTION OF ILLUSTRATIVE EMBODIMENTS

Related technical knowledge in embodiments of this application is first described with reference to FIG. 1 to FIG. 4.

Figure 1:
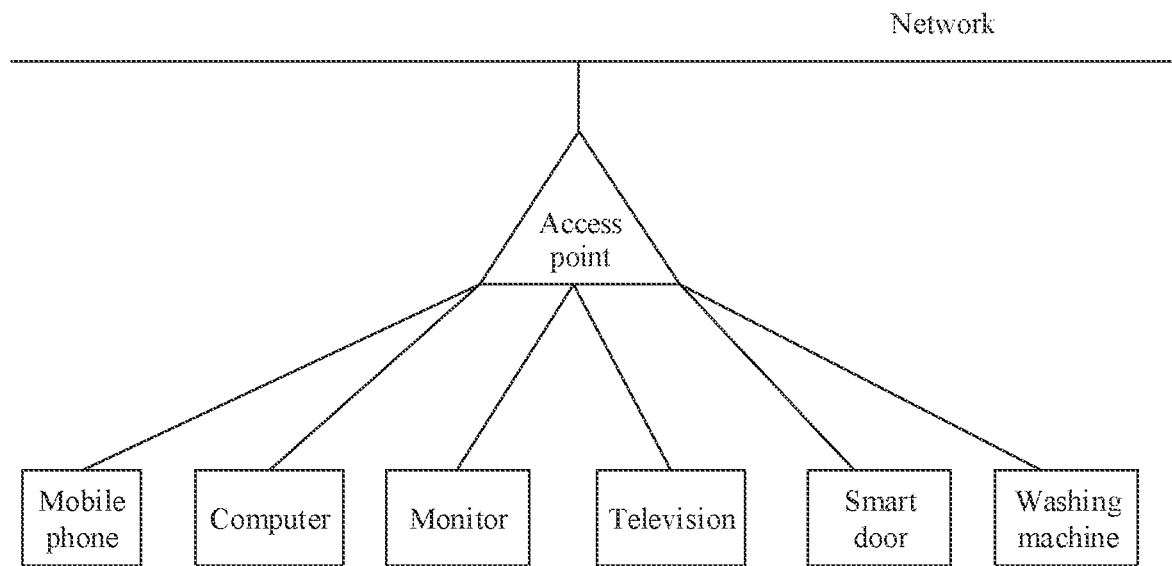
FIG. 1 is a schematic diagram of an internet of things topology according to an embodiment of this application.

An internet of things (IoT) network is an information carrier such as the internet and a conventional telecommunications network, and is a network that implements interoperability between all common objects that can perform independent functions. FIG. 1 is a schematic diagram of an internet of things topology. Various objects, products, and the like are connected together through a communications system. The IoT is generally a wireless network. A possible IoT application scenario is as follows: In the IoT, each person can connect a real object to the internet by using an electronic label, and a specific position of the object can be found on the IoT. Based on the IoT, a central computer may be configured to: centrally manage and control machines, devices, and personnel, remotely control a home device and a vehicle, search for a position, prevent an object from being stolen, or the like. Similar to an automatic control system, the central computer may be used for data collection. The data is used for road redesign, to reduce traffic accidents, or is used for urban renewal, disaster prediction, crime prevention, epidemic control, and the like.

The narrowband internet of things (Narrowband-IoT, NB-IoT) and the long range internet of things (LoRa) are IoT networks that are relatively widely used currently. Table 1 shows comparison of technical parameters between the NB-IoT and the LoRa.

TABLE 1

Comparison of main technical parameters between the NB-IoT and the LoRa

| IoT framework | NB-IoT | LoRa |
| --- | --- | --- |
| Bandwidth | 180 kHz | 125 kHz |
| Spectrum authorization | Charge authorization | Free authorization |
| Peak rate | 200 kbps | 10 kbps |
| Distance | 18-21 km | 12-15 km |
| Module cost | $16-20 USD | $8-10 USD |
| Peak current | 32 mA | 120-300 mA |
| Latency | High | Low |

It can be learned from Table 1 that both the NB-IoT and the LoRa have requirements such as low power consumption, wide coverage, and low costs that are required by the IoT network. However, the NB-IoT is based on a cellular network and uses a charged spectrum. The LoRa uses a free spectrum and cannot interwork with a wireless local area network (WLAN) product. As a result, an additional LoRa module and an additional protocol interaction gateway are required.

An IEEE 802.11ax network based on a free frequency band can respectively provide a maximum data rate of 1.1 Gbps, 2.3 Gbps, 4.8 Gbps, or 9.6 Gbps in a bandwidth of 20 MHz, 40 MHz, 80 MHz, or 160 MHz. The IEEE 802.11ax network has features such as relatively high power consumption, a short transmission distance, and a relatively low latency, and can interwork with the WLAN product. In addition, the IEEE 802.11ax network is based on the free frequency band, thereby effectively reducing costs and facilitating deployment.

Figure 2:
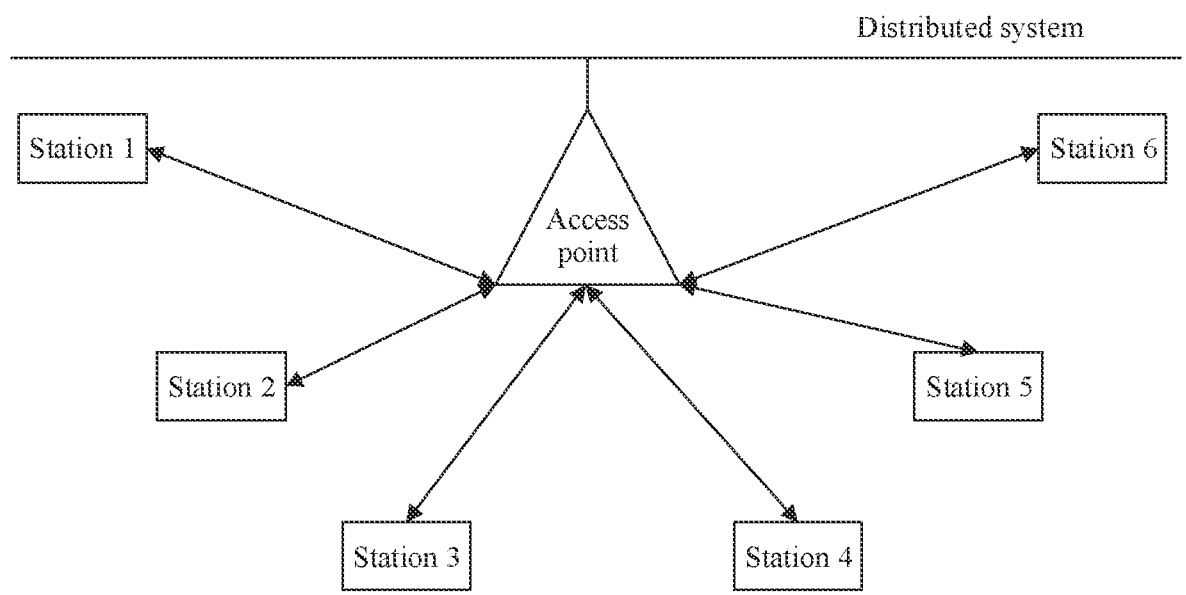
FIG. 2 is a schematic diagram of a network topology according to an embodiment of this application.

In a typical IEEE 802.11ax network, a set including an access point (AP) and some stations (STA) is also referred to as a basic service set (BSS). FIG. 2 is a schematic diagram of a network topology. The AP manages the BSS, and may be considered as a central station. The STAs are connected to a network through the AP, and obtain required data and services from the AP. The BSS has an uplink and downlink bidirectional communication function, and is connected to another BSS through a distributed system (DS). Basic frequency resources of a network that is based on an IEEE 802.11ax protocol are divided by a resource unit (RU). Currently, RUs in IEEE 802.11ax are mainly classified into a 26-tone RU, a 52-tone RU, a 106-tone RU, a 242-tone RU, a 484-tone RU, and a 996-tone RU. As basic frequency resource units, RUs are allocated to different users for uplink and downlink data transmission in a BSS. RUs with different sizes occupy different bandwidths, and may also carry services of different rates. A relatively large RU may carry a radio transmission service with a relatively large amount of data. It should be noted that, in an existing broadband scenario, IEEE 802.11ax does not provide a targeted optimization design for the IoT that operates in a narrowband. Therefore, the RU in IEEE 802.11ax cannot be directly used to serve the IoT network that requires only a relatively narrow bandwidth in the future.

Figure 3:
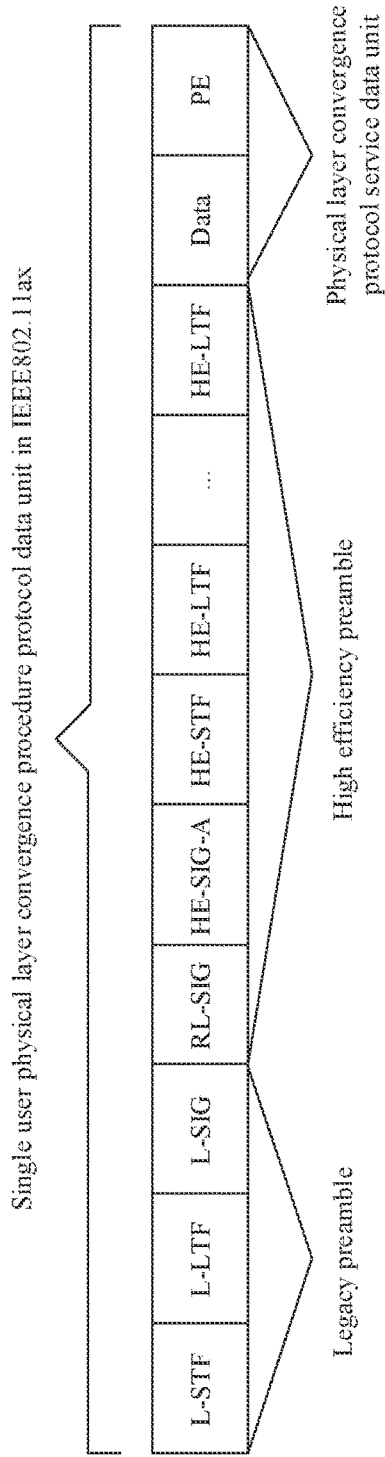
FIG. 3 is a schematic diagram of a single user physical layer convergence procedure protocol data unit according to an embodiment of this application.

According to the IEEE 802.11ax protocol, FIG. 3 is a schematic diagram of a format of a single user (SU) physical layer convergence procedure protocol data unit (PPDU). The SU PPDU includes a legacy preamble (L-Preamble), a high efficiency preamble (HE-Preamble), and a physical layer service data unit (Physical Layer Convergence Protocol Service Data Unit, PSDU). The L-preamble includes a legacy short training sequence (Legacy-Short Training Field, L-STF), a legacy long training sequence (Legacy-Long Training Field, L-LTF), and a legacy signaling field (L-SIG). The L-STF is used by a receiving device to implement functions such as signaling and data field synchronization, automatic gain control (AGC), and frequency offset estimation. The STF may be a sequence including a plurality of periodicities, or may be a sequence including only one periodicity. The L-LTF is used for channel estimation, a more accurate time synchronization process, and further frequency offset estimation. The L-SIG includes information such as a packet rate and a packet length. Similarly, the HE-preamble part also includes a SIG, an STF, and a long training sequence (Long Training Field, LTF). The HE-STF and the HE-LTF are mainly used to implement functions such as automatic gain control and channel estimation at a sampling rate different from that used by the legacy preamble. The PSDU carries a data part. The L-STF is obtained after 64-point inverse fast Fourier transform (IFFT) is performed on a 64-point frequency domain sequence. The L-STF is sent on a 20 MHz channel, and the HE-preamble and the PSDU are also sent on the 20 MHz channel.

The technical solutions in this application may be used in various communications systems such as a WLAN network and an IoT network, an internet of vehicles network, another network, or the like. This is not specifically limited in this application. For example, an application scenario of this application may be a WLAN network that is based on an IEEE 802.11ax standard, an IoT network that is based on an IEEE 802.11ax standard, an internet of vehicles (Vehicle-to-X, V2X) network that is based on an IEEE 802.11ax standard, or another network that is based on an IEEE 802.11ax standard.

Figure 4:
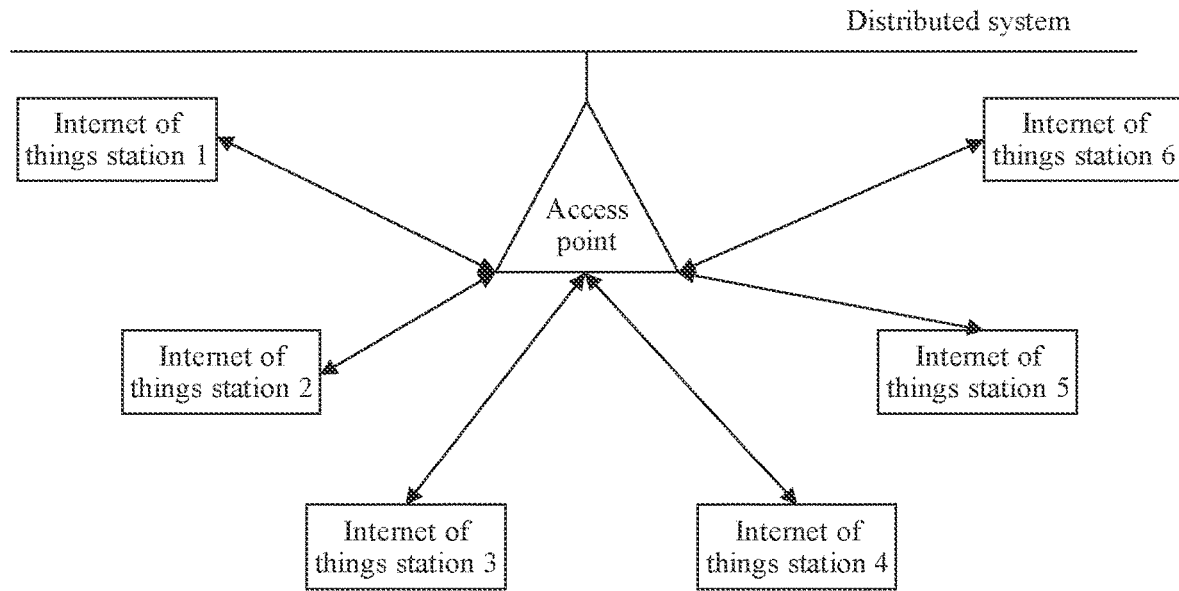
FIG. 4 is a schematic diagram of an IoT network scenario according to an embodiment of this application.

An IoT network is used as an example. FIG. 4 is a schematic diagram of an IoT network scenario. The network architecture includes an AP and IoT STAs associated with the AP. The AP is associated with a plurality of IoT STAs, so that the IoT STAs can implement uplink and downlink communication.

The station in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The station may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

The access point AP in the embodiments of this application may be a device configured to communicate with the station. The access point may be any device having a wireless sending and receiving function or a chip that may be disposed in the device. The device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), or an access point (AP), a wireless relay node, a wireless backhaul node, a transmission point (TP), a transmission reception point (TRP), or the like in a wireless fidelity (Wi-Fi) system, or may be a gNB or a transmission point (TRP or TP) in a 5G system, for example, an NR system, or one antenna panel or a group of antenna panels (including a plurality of antenna panels) of a base station in a 5G system, or may be a network node, for example, a baseband unit (BBU) or a distributed unit (DU), that constitutes a gNB or a transmission point.

This application provides a method for designing a short training sequence in a physical layer convergence procedure protocol data unit. For ease of description, the short training sequence is referred to as an internet of things short training sequence (IoT-Short Training Field, IoT-STF) for short. Time synchronization and AGC adjustment can be supported on an IoT data part in a bandwidth less than 20 MHz, so that when an AP, a STA, or the like in the IoT network performs low-speed, low-power, or long-distance information transmission, the AP, the STA, or the like extracts and processes the IoT-STF, included in the received PPDU, provided in this application. In this way, time synchronization and AGC adjustment are performed on a narrowband PPDU transmitted in the IoT network, so that a transmitted data field in the PPDU can be correctly received and decoded.

It should be noted that the technical solutions of this application may be used in communication between APs, communication between an AP and a STA, or communication between STAs. The following uses communication between an AP and a STA as an example for description, and does not constitute a limitation on the embodiments of this application.

The following describes methods and related apparatuses in the embodiments of this application in detail with reference to the accompanying drawings. It should be noted that a presentation sequence of the embodiments of this application represents only a sequence of the embodiments, and does not represent priorities of the technical solutions provided in the embodiments.

Figure 5:
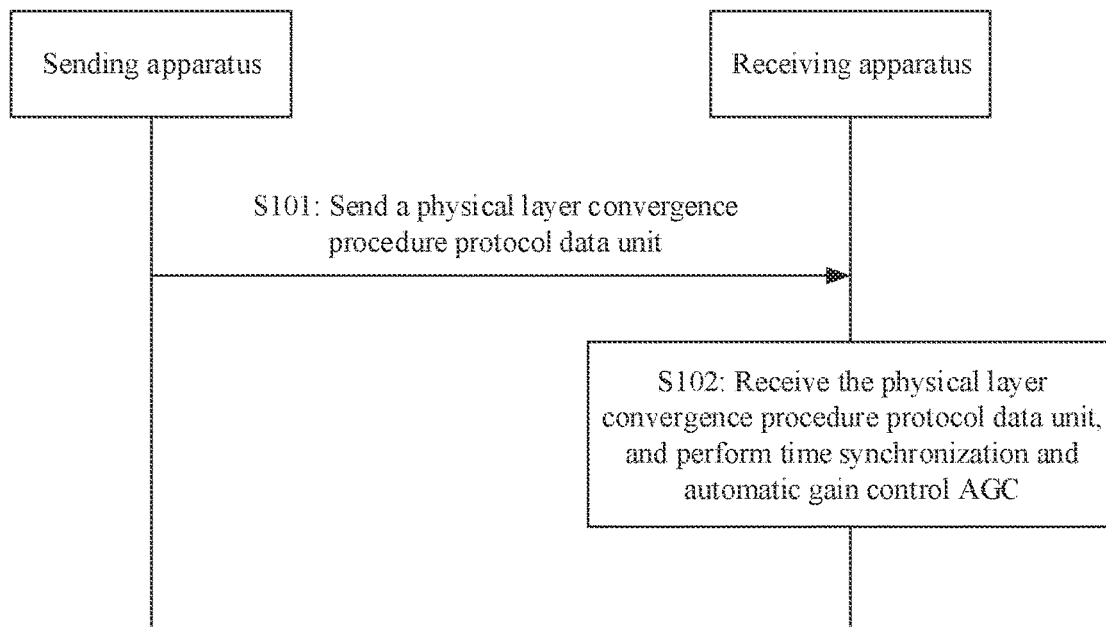
FIG. 5 is a schematic flowchart of a physical layer convergence procedure protocol data unit communication method according to an embodiment of this application.

FIG. 5 is a schematic flowchart of a physical layer convergence procedure protocol data unit communication method according to an embodiment of this application. As shown in FIG. 5, the method includes but is not limited to the following steps.

S101: A sending apparatus sends a physical layer convergence procedure protocol data unit PPDU to a receiving apparatus, where the PPDU includes synchronization adjustment indication information and a data field, and the synchronization adjustment indication information and the data field are sent in a bandwidth less than 20 MHz.

S102: The receiving apparatus receives the physical layer convergence procedure protocol data unit PPDU sent by the sending apparatus, and performs time synchronization and automatic gain control AGC adjustment on the data field based on the synchronization adjustment indication information included in the PPDU.

Specifically, the sending apparatus may be an AP, and the receiving apparatus may be a STA. An AP-to-STA communication process corresponds to a downlink communication process.

The synchronization adjustment indication information is used to perform time synchronization and AGC adjustment on the data field (namely, an IoT data part). The synchronization adjustment indication information may also be referred to as an internet of things short training sequence IoT-STF. It may be understood that the synchronization adjustment indication information may have another name in a specific standard. In this application, the IoT-STF is used for representation only for ease of subsequent description. This application is not limited thereto.

Specifically, the AP may send a downlink PPDU to a station after receiving an information request message sent by the station, or may actively send the PPDU to a station based on another indication message in a network.

Specifically, after receiving the PPDU sent by the AP, the station extracts the IoT-STF from the PPDU, and performs, based on the IoT-STF, time synchronization and AGC adjustment on a narrowband PPDU transmitted in an IoT network.

In a possible implementation, the PPDU further includes a legacy preamble L-preamble, and the legacy preamble L-preamble is sent in a bandwidth in a unit of 20 MHz. To be specific, the L-preamble may be sent in a bandwidth of 20 MHz, or may be sent in a bandwidth greater than 20 MHz. For example, the L-preamble may be sent in a bandwidth of 40 MHz (two 20 MHz), or may be sent in a bandwidth of 80 MHz (four 20 MHz). This is not specifically limited in this embodiment of this application.

In an actual application scenario, stations associated with the AP may include an IoT device (a device supporting narrowband communication) and a conventional broadband device (for example, a device supporting 802.11ax or a standard previous to 802.11ax). The AP sends a downlink PPDU not only to the IoT device, but also to some conventional broadband devices. Because the conventional broadband device has a high-rate transmission requirement, the AP needs to send the downlink PPDU to the conventional broadband device in a relatively high bandwidth of 20 MHz or greater than 20 MHz. A service of the IoT device has features such as a low speed and low power consumption, and the AP only needs to send the PPDU to the IoT device in a relatively low bandwidth less than 20 MHz.

It should be noted that the bandwidth in this application may be a resource unit of an orthogonal frequency division multiplexing (OFDM) format, or may be another frequency resource. This is not limited in this application. It should be noted that, because both an IoT device and a broadband device exist in a network architecture, to improve performance and reduce a probability of sending collision, stations such as the IoT device and the broadband device may avoid sending collision by using a method of carrier sense multiple access (CSMA/CA) with collision avoidance.

In a possible format of the PPDU, the PPDU includes an L-preamble and an IoT part. The L-preamble may include an L-STF, an L-LTF, and an L-SIG. Before a field of the IoT part, the PPDU may further include a frame type indication. The L-STF is used by a receiving device to implement a signaling and data field synchronization function and an AGC adjustment function. The L-SIG includes information such as a packet rate and a packet length. The L-LTF is used for channel estimation and more accurate frequency offset estimation. It should be noted that, the frame type indication is optional, and is used to indicate a type of a frame structure, and the frame type indication is a binary phase shift keying (BPSK) modulation symbol. The IoT part includes an IoT-STF and another field of the IoT part. The IoT-STF is used to perform time synchronization and AGC adjustment on the another field of the IoT part. The another field of the IoT part carries an IoT service. It should be noted that the PPDU sent by the AP to the STA may alternatively not include the L-preamble.

Figure 6:
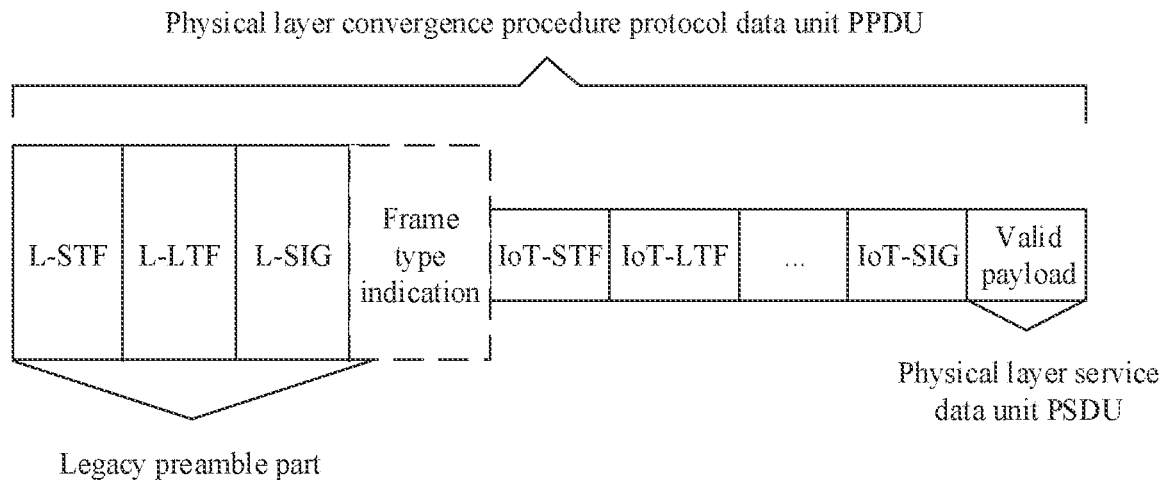
FIG. 6 is a schematic diagram of an IoT physical layer convergence procedure protocol data unit PPDU according to an embodiment of this application.

FIG. 6 shows an IoT physical layer convergence procedure protocol data unit PPDU according to an embodiment of this application. The PPDU includes a legacy preamble part and an IoT part. The legacy preamble part includes an L-STF, an L-LTF, and an L-SIG. In addition, the legacy preamble part further includes a frame type indication. All of the L-STF, the L-LTF, the L-SIG, and the frame type indication are sent in relatively high bandwidth, for example, a bandwidth of 20 MHz. The IoT part includes an IoT-STF, an IoT-LTF, an IoT-SIG, and an IoT data part (valid payload). The IoT-STF, the IoT-LTF, the IoT-SIG, and the IoT data part are sent in a bandwidth less than 20 MHz, for example, a bandwidth of 5 MHz.

A conventional broadband device (for example, a device that supports 802.11ax or a standard previous to 802.11ax) that receives the PPDU can decode and read only the L-STF, the L-LTF, and the L-SIG in the legacy preamble part, but cannot decode the frame type indication and the IoT part. A next-generation broadband device (for example, a device that supports a next-generation standard of 802.11ax) can read the legacy preamble part and the frame type indication. After obtaining the frame type indication through reading, the next-generation broadband device determines that a content next to the frame type field is the IoT data part. In this case, the next-generation broadband device stops parsing the IoT part of the PPDU, and directly executes a backoff process, thereby further reducing power consumption. In addition, by decoding and reading the L-STF, the L-LTF, and the L-SIG in the legacy preamble part, the next-generation broadband device learns that a channel has been occupied, and executes the backoff process, to avoid collision. Because an IoT device (for example, a device that can decode the IoT data part in this application) that receives the PPDU operates in a narrowband, the IoT device cannot decode and read the legacy preamble part and the frame type indication, and can only decode the IoT part. Therefore, time synchronization and automatic gain control AGC can be performed on the IoT data part based on the IoT-STF sequence of the IoT part, so that IoT data carried in the IoT data part can be obtained through parsing.

It can be learned that, when the PPDU provided in this application is used for data transmission, a sending apparatus can communicate not only with the broadband device but also with the IoT device that occupies a relatively narrow bandwidth, thereby ensuring good compatibility. In addition, the frame type indication is carried before the IoT data part, so that the next-generation broadband device can be prevented from decoding the entire PPDU, thereby further reducing power consumption of the next-generation broadband device.

In a possible implementation, the bandwidth less than 20 MHz includes k subcarriers in frequency domain, a synchronization adjustment indication information includes information obtained after inverse fast Fourier transform (IFFT) is performed on sequence values of the k subcarriers in frequency domain, and the sequence values of the k subcarriers are a subset of sequence values of a legacy short training sequence L-STF in a L-preamble in frequency domain.

Specifically, the L-STF is obtained after IFFT is performed on values, transmitted on 64 subcarriers, of frequency domain sequences (represented by an L-S1 herein), and the sequence values, transmitted on subcarriers [−26, 26], of the L-S1 are shown in Formula 1:

$$S_{-26,26} = \sqrt{13/6}\{0,0,1+j,0,0,0,-1-j,0,0,0,1+j,0,0,0,-1\\-j,0,0,0,-1-j,0,0,0,1+j,0,0,0,0,0,0,-1-j,0,0,0,-\\1-j,0,0,0,1+j,0,0,0,1+j,0,0,0,1+j,0,0,0,1+j,0,0\}$$ Formula 1

A subscript (−26,26) in $S_{-26,26}$ refers to 53 subcarriers numbered from −26 to 26, and $S_{-26,26}$ corresponds to sequence values of the 53 subcarriers numbered from −26 to 26. Formula 1 provides values of 53 frequency domain sequences in the L-S1, where each value represents a value transmitted on a subcarrier. In addition, a left end of the 53 subcarriers further includes six sideband subcarriers, and sequence values of the six sideband subcarriers are all 0; and a right end of the 53 subcarriers further includes five sideband subcarriers, and sequence values of the five sideband subcarriers are also 0. The six sideband subcarriers, the 53 subcarriers, and the five sideband subcarriers form a 64-point frequency domain sequence L-S1. Because the left and right ends are close to adjacent channels, the 11 sideband subcarriers whose values are 0 serve as a guard spacing, thereby avoiding interference from the adjacent channels. It should be noted that a spacing between every two adjacent subcarriers is 312.5 kHz. The L-STF is obtained after 64-point IFFT and a series of subsequent processing are performed on the 64-point frequency domain sequence included in the L-S1, and is sent on a 20 MHz channel.

The IoT-STF in this application is obtained after IFFT transform is performed on the sequence values of the k subcarriers in frequency domain, where the k is a positive integer greater than 0 and less than or equal to 64. In addition, the sequence values of the k subcarriers are a subset of the sequence values of the L-S1 in frequency domain.

It may be understood that, to design and optimize an IoT network, and implement time synchronization and AGC adjustment in the IoT network, the IoT-STF in this application may be designed based on an existing L-STF.

In a possible implementation, the sequence values of the k subcarriers in frequency domain include sequence values IoT-S1$_{-13,13}$ of 27 subcarriers in frequency domain.

Specifically, the sequence values of the 27 subcarriers included in IoT-S1$_{-13,13}$ are a subset of the sequence values of the L-S1 in frequency domain.

In a possible implementation, the sequence values of the k subcarriers in frequency domain further include sequence values of five sideband subcarriers in frequency domain, the sequence values of the five sideband subcarriers are 0, and two ends of IoT-S1$_{-13,13}$ respectively include a sideband subcarriers in the five sideband subcarriers and b sideband subcarriers in the five sideband subcarriers, where a and b are positive integers, and a+b=5.

Specifically, the sequence values of the five sideband subcarriers have a function similar to that of the 11 sideband subcarriers in the L-S1, that is, serve as a guard spacing, thereby avoiding interference from the adjacent channels. The five sideband subcarriers and IoT-S1$_{-13,13}$ form a 32-point frequency domain sequence IoT-S1 in frequency domain. For example, a left end of the IoT-S1 may include a sequence value of one sideband subcarrier, and a right end of the IoT-S1 includes sequence values of four sideband subcarriers. For another example, a left end of the IoT-S1 may include sequence values of two sideband subcarriers, and a right end of the IoT-S1 includes sequence values of three sideband subcarriers. Alternatively, another combination that meets the condition a+b=5 is used. This is not limited in this application.

It should be noted that the synchronization adjustment indication information is information obtained after IFFT is performed on a series of sequence values of the subcarriers in frequency domain. To meet a requirement of an IFFT fast algorithm, a quantity of sequence values of subcarriers corresponding to the synchronization adjustment indication information needs to be N, power of 2 (where N is a positive integer), for example, 2, 4, 8, 16, 32, or 64. However, to use frequency resources more efficiently, when a bandwidth B includes M subcarriers, a selected quantity of sequence values may be a maximum value of N that meets: $2^N \leq M$. In other words, when the selected quantity of sequence values (a quantity of IFFT points) is $2^N$, a minimum quantity of subcarriers included in the bandwidth B may be $2^N$.

For example, when a bandwidth, for example, a 52-tone RU, that carries the synchronization adjustment indication information includes 52 subcarriers, where a spacing between every two adjacent subcarriers is 78.125 kHz, a frequency domain sequence including sequence values of 32 subcarriers in frequency domain provided in this embodiment of this application may be alternatively selected.

For another example, when a bandwidth that carries the synchronization adjustment indication information includes 32 subcarriers, a frequency domain sequence including sequence values of 32 subcarriers in frequency domain provided in this embodiment of this application may be alternatively selected.

In a possible implementation, IoT-S1$_{-13,13}$= $\sqrt{13/6}\{0,1+j,0,-1-j,0,1+j,0,-1-j,0,-1-j,0,1+j,0,0,0,-1-j,0,-1-j,0,1+j,0,1+j,0,1+j,0,1+j,0\}$.

Specifically, IoT-S1$_{-13,13}$ is obtained by performing transform on S$_{-26,26}$ corresponding to Formula 1. A sequence value whose value is 0 is removed from each of the second position and the penultimate position at the two ends of S$_{-26,26}$. Sequence values between the second position and the penultimate position are retained by removing, in a fixed spacing (that is, in a spacing of every two sequence values), two sequence values whose values are 0 and that appear cyclically. Sequence values of 27 subcarriers corresponding to IoT-S1$_{-13,13}$ can be obtained through the foregoing transform. It should be noted that, two ends of the 27 subcarriers in IoT-S1$_{-13,13}$ respectively include a sideband subcarriers whose sequence values are 0 and b sideband subcarriers whose sequence values are 0, where a and b are positive integers and meet: a+b=5. The five sideband subcarriers whose values are 0 have a function similar to that of the 11 sideband subcarriers in the L-S1, that is, serve as a guard spacing, thereby avoiding interference from the adjacent channels. The five sideband subcarriers and IoT-S1$_{-13,13}$ form a 32-point frequency domain sequence IoT-S1. For example, a left end of IoT-S1$_{-13,13}$ further includes sequence values of three sideband subcarriers, and the three sequence values are all 0; and a right end of IoT-S1$_{-13,13}$ includes sequence values of two sideband subcarriers, and the two sequence values are also 0. In this way, the 32-point frequency domain sequence IoT-S1 can be obtained, so that 32-point IFFT can be performed.

It may be understood that, because the IoT-S1 is obtained by removing, in the fixed spacing, some sequence values in S$_{-26,26}$ whose values are 0 and that appear cyclically, according to a property of Fourier transform, after 32-point IFFT is performed on the IoT-S1, a peak-to-average power ratio (PAPR) feature of the IoT-S1 is consistent with a PAPR feature corresponding to the L-STF. However, in time domain, the L-S1 includes four periodicities after IFFT is performed, and after a cyclic prefix (CP) whose length is 25% of the four periodicities is added, each time domain symbol in the obtained L-STF includes five periodicities; and the IoT-S1 includes two periodicities after IFFT is performed, and after a cyclic prefix (CP) whose length is 25% of the two periodicities is added, a time domain symbol (represented by an IoT-s1) corresponding to each IoT-S1 includes 2.5 periodicities. A specific method for adding a cyclic prefix is not specifically limited in this application. For example, 25% of a periodicity length at the end of each periodicity may be added to the beginning of the periodicity.

It should be noted that a subcarrier spacing between subcarriers corresponding to a frequency domain sequence is not limited in this embodiment of this application, provided that transmission is performed in a narrowband less than 20 MHz. For example, if a bandwidth that carries the IoT data part includes 32 subcarriers, and a spacing between every two subcarriers is 78.125 kHz, two periodicities are included after 32-point IFFT transform is performed, and a length of each periodicity is 6.4 μs.

In an example, a time domain expression IoT-STF1 corresponding to the IoT-S1 may alternatively include N time domain symbols, where N is an integer greater than or equal to 1. It should be noted that an L-STF obtained after IFFT is performed on an entire L-S1 includes two time domain symbols. Therefore, the two time domain symbols include a total of 10 cyclic periodicities. If it is expected that the IoT-STF1 including the 10 cyclic periodicities is also obtained after IFFT is performed on the IoT-S1, and each IoT-s1 includes 2.5 periodicities, the IoT-s1 may be repeated for four times to obtain the IoT-STF1. In other words, the IoT-STF1 includes four time domain symbols, and an expression of the IoT-STF1 is shown in Formula 2:

$$\text{IoT-STF1} = \{\text{IoT-}s1, \text{IoT-}s1, \text{IoT-}s1, \text{IoT-}s1\} \quad \text{Formula 2}$$

The IoT-STF1 represents the time domain expression corresponding to the IoT-S1, and the IoT-s1 represents a time domain symbol corresponding to each IoT-S1.

It may be understood that, the IoT-S1 and the IoT-STF1 form a function relationship, and a unique IoT-STF1 may be obtained based on the IoT-S1.

It can be learned that a PAPR feature corresponding to the IoT-STF1 provided in the foregoing embodiment is consistent with the PAPR feature corresponding to the L-STF, and the IoT-STF1 and the L-STF have a same periodicity feature. In addition, the IoT-STF1 also has features similar to those of the L-STF, namely, a good time synchronization feature and a good PAPR feature, and may provide a time synchronization function and an AGC adjustment function for an IoT data part transmitted in a narrowband, so that the receiving apparatus can correctly receive and decode the IoT data part transmitted in the narrowband.

In a possible implementation, $\text{IoT-S1}_{-13,13} = \sqrt{13/6}\{0,-1-j,0,0,0,-1-j,0,0,0,1+j,0,0,0,0,0,0,-1-j,0, 0,0,-1-j,0,0,0,1+j,0\}$.

Specifically, similar to the foregoing embodiment, IoT-S1$_{-13,13}$ is also obtained by performing transform on $S_{-26,26}$ corresponding to Formula 1. Only middle 27 sequence values are retained by removing first 13 sequence values and last 13 sequence values from two ends of $S_{-26,26}$. Sequence values of 27 subcarriers corresponding to IoT-S1$_{-13,13}$ can be obtained through the foregoing transform. It should be noted that, two ends of the 27 subcarriers corresponding to IoT-S1$_{-13,13}$ respectively include a sideband subcarriers whose sequence values are 0 and b sideband subcarriers whose sequence values are 0, where a and b are positive integers and meet: a+b=5. The five sideband subcarriers whose values are 0 have a function similar to that of the 11 sideband subcarriers in the L-S1, that is, serve as a guard spacing, thereby avoiding interference from the adjacent channels. The five sideband subcarriers and IoT-S1$_{-13,13}$ form a 32-point frequency domain sequence IoT-S1 in frequency domain. For example, three sequence values corresponding to three sideband subcarriers are added to a left end of the IoT-S1, and the three sequence values are 0; and two sequence values corresponding to two sideband subcarriers are added to a right end of the IoT-S1, and the two sequence values are 0. In this way, the 32-point frequency domain sequence IoT-S1 can be obtained, so that 32-point IFFT can be performed.

It may be understood that, because the IoT-S1 is obtained by directly removing the sequence values at the beginning and the end of the sequence $S_{-26,26}$, according to a property of Fourier transform, after 32-point IFFT is performed on the IoT-S1, a PAPR feature of the IoT-S1 is similar to a PAPR feature corresponding to the L-STF. However, a difference between the PAPR feature of the IoT-S1 and the PAPR feature corresponding to the L-STF is that a PAPR value of the original 64-point L-S1 is 1.7084, and a PAPR value of the IoT-S1 obtained through compression is 3.3604. However, in time domain, the IoT-S1 includes four periodicities after IFFT is performed. A time domain symbol is obtained after a cyclic prefix whose length is 25% of the four periodicities is added, and each time domain symbol (represented by an IoT-s1) corresponds to five periodicities, where each time domain symbol includes a CP of one periodicity.

In an example, a time domain expression IoT-STF1 corresponding to the IoT-S1 may alternatively include N time domain symbols, where N is an integer greater than or equal to 1. In an existing protocol, an L-STF obtained after IFFT is performed on an entire L-S1 includes two time domain symbols, where each time domain symbol includes five periodicities, and the five periodicities include a CP of one periodicity. Therefore, the two time domain symbols include a total of 10 cyclic periodicities. If it is expected that the IoT-STF1 including the 10 cyclic periodicities is also obtained after IFFT is performed on the IoT-S1, and each IoT-s1 includes five periodicities, the IoT-s1 only needs to be repeated twice. In other words, the IoT-STF1 includes two time domain symbols, and an expression of the IoT-STF1 is shown in Formula 3:

$$\text{IoT-STF1} = \{\text{IoT-}s1, \text{IoT-}s1\} \quad \text{Formula 3}$$

The IoT-STF1 represents the time domain expression corresponding to the IoT-S1, and the IoT-s1 represents a time domain symbol corresponding to each IoT-S1.

It may be understood that, the IoT-S1 and the IoT-STF1 form a function relationship, and a unique IoT-STF1 may be obtained based on the IoT-S1.

Herein, because the PAPR feature of the IoT-STF1 provided above is not completely consistent with the PAPR feature corresponding to the L-STF, and there is a relatively large difference, in another manner, some adjustment is performed on the IoT-S1, so that a sequence obtained through adjustment has a lower PAPR value and better synchronization performance.

However, to ensure that the sequence obtained through adjustment still has good synchronization performance and is consistent with another feature of the IoT-S1 provided above, the sequence obtained through adjustment needs to have a nonzero position that is the same as that of the IoT-S1, and specific values at the nonzero position are different but are still combinations of ±1 and ±j.

In this embodiment of this application, a sequence having a lower PAPR value and better synchronization performance may be obtained through simulation calculation by traversing possible IoT-STF sequences. The following steps are specifically included.

Step 1: IFFT is performed on a frequency domain sequence (including a sequence value of a sideband subcarrier) corresponding to the IoT-STF, to transform the frequency domain sequence into a time domain signal $Z_i$.

It should be noted that the frequency domain sequence corresponding to the IoT-STF herein needs to include a plurality of sequences. These sequences have a same nonzero position, and values at the nonzero position are different. In addition, a plurality of $Z_i$ are obtained through IFFT transform, where $Z_i$ is a digital domain signal (namely, a discretely timed signal).

Step 2: Cross-correlation is performed between the plurality of $Z_i$ and a periodic signal $Y_i$ in locally stored $Z_i$. A plurality of first peak-to-second peak ratios (that is, a first peak is divided by a second peak) are obtained through calculation. A sequence in which an absolute value of the plurality of first peak-to-second peak ratio is greater than a first threshold is selected. In this way, it is ensured that a frequency domain sequence corresponding to the sequence has relatively good synchronization performance. The first threshold may be set based on a requirement. This is not limited in this application.

Step 3: When the absolute value of the first peak-to-second peak ratio is greater than the first threshold, oversampling is performed on a time domain signal obtained after IFFT transform is performed on the sequence that has relatively good synchronization performance and that is selected in step 2. A sampling multiple may be set based on a requirement. In this application, a plurality of oversampled time domain signals $X_i$ are obtained through five-times oversampling. A PAPR corresponding to each $X_i$ is calculated, to select a frequency domain sequence corresponding to an optimal PAPR. The PAPR may be obtained through calculation according to Formula 4, where Formula 4 is:

$$PAPR = 10\log_{10}\left(\frac{\max(X_i^2)}{\text{mean}(X_i^2)}\right) \quad \text{Formula 4}$$

$X_i$ is a sampled signal in time domain, i is a sampling sequence number, max is a MAX function, and mean is a mean function. An IoT-STF sequence that obtains the optimal PAPR when the absolute value of the first peak-to-second peak ratio is relatively large is selected through simulation calculation.

Table 2 shows a frequency domain sequence that is selected in this application and that corresponds to the IoT-STF that obtains the optimal PAPR when the absolute value of the first peak-to-second peak ratio is greater than the first threshold.

TABLE 2

Sequence having a nonzero position that is the same as that of an IoT-S₁ but having a relatively low PAPR

| Frequency domain sequence corresponding to an IoT-STF | PAPR | \|First peak/ Second peak\| |
|---|---|---|
| $\sqrt{13/6}$ {0, 1 + j, 0, 0, 0, 1 + j, 0, 0, 0, −1 − j, 0, 0, 0, 0, 0, 0, 0, −1 − j, 0, 0, 0, 1 + j, 0, 0, 0, −1 − j, 0} | 2.6865 | 2.9401 |
| $\sqrt{13/6}$ {0, 1 + j, 0, 0, 0, −1 − j, 0, 0, 0, 1 + j, 0, 0, 0, 0, 0, 0, 0, 1 + j, 0, 0, 0, −1 − j, 0, 0, 0, −1 − j, 0} | 2.7096 | 2.9401 |
| $\sqrt{13/6}$ {0, 1 + j, 0, 0, 0, −1 − j, 0, 0, 0, 1 + j, 0, 0, 0, 0, 0, 0, 0, 1 − j, 0, 0, 0, −1 − j, 0, 0, 0, 1 + j, 0} | 2.6661 | 2.9401 |
| $\sqrt{13/6}$ {0, 1 + j, 0, 0, 0, −1 − j, 0, 0, 0, −1 − j, 0, 0, 0, 0, 0, 0, 0, 1 + j, 0, 0, 0, −1 − j, 0, 0, 0, 1 + j, 0} | 2.6667 | 2.9401 |
| $\sqrt{13/6}$ {0, −1 − j, 0, 0, 0, 1 + j, 0, 0, 0, 1 + j, 0, 0, 0, 0, 0, 0, 0, −1 − j, 0, 0, 0, 1 + j, 0, 0, 0, −1 − j, 0} | 2.6675 | 2.9401 |
| $\sqrt{13/6}$ {0, −1 − j, 0, 0, 0, 1 + j, 0, 0, 0, −1 − j, 0, 0, 0, 0, 0, 0, 0, 1 + j, 0, 0, 0, 1 + j, 0, 0, 0, −1 − j, 0} | 2.6681 | 2.9401 |
| $\sqrt{13/6}$ {0, −1 − j, 0, 0, 0, 1 + j, 0, 0, 0, −1 − j, 0, 0, 0, 0, 0, 0, 0, −1 − j, 0, 0, 0, 1 + j, 0, 0, 0, 1 + j, 0} | 2.7133 | 2.9401 |
| $\sqrt{13/6}$ {0, −1 − j, 0, 0, 0, −1 − j, 0, 0, 0, 1 + j, 0, 0, 0, 0, 0, 0, 0, 1 + j, 0, 0, 0, −1 − j, 0, 0, 0, 1 + j, 0} | 2.7406 | 2.9401 |

It can be learned from Table 2 that, absolute values of first peak-to-second peak ratios corresponding to all selected frequency domain sequences are relatively large, and PAPR values are relatively small, so that good synchronization performance is ensured. Any sequence may be selected, a sequence value of a sideband subcarrier is added to the sequence, and then 32-point IFFT is performed, to obtain the IoT−STF.

It should be noted that all the selected frequency domain sequences not only include sequence values of 27 subcarriers. In addition, a left end of the 27 subcarriers in the frequency domain sequence further includes a sideband subcarriers whose sequence values are 0, and a right end of the 27 subcarriers includes b sideband subcarriers whose sequence values are 0 (not shown in Table 2), where a and b meet a condition: a and b are positive integers, and a+b=5. The five sideband subcarriers whose values are 0 have a function similar to that of the 11 sideband subcarriers in the L-S1, that is, serve as a guard spacing, thereby avoiding interference from the adjacent channels. For example, the left end of the selected frequency domain sequence includes three sequence values whose values are 0, and the three sequence values correspond to three sideband subcarriers; and the right end of the selected frequency domain sequence includes two sequence values whose values are 0, and the two sequence values correspond to two sideband subcarriers. In this way, the 32-point frequency domain sequence can be obtained, so that 32-point IFFT can be performed.

It should be noted that, the IoT−S1 includes the sequence values of the 27 subcarriers and the sequence values of the five sideband subcarriers, so that 32-point IFFT can be performed. Therefore, when a bandwidth that carries the IoT data part includes 32 subcarriers, and 32-point IFFT can be performed, the IoT−STF can be obtained based on the L-S1. In addition, the sequence designed in this embodiment of this application may be used in a next-generation standard that is based on 802.11ax, or may be used in another standard. For example, in 802.11ax, if the valid payload (namely, an IoT PSDU) in the IoT PPDU occupies a bandwidth of a 52-tone RU, where the 52-tone RU includes 52 subcarriers, and a spacing between every two subcarriers of the 52-tone RU is 78.125 kHz, a requirement of 32-point IFFT is met. Therefore, the sequence IoT−S1$_{−13,13}$ designed in this embodiment of this application can be used. In other words, the sequence IoT−S1$_{−13,13}$ can be used when the bandwidth is the 52-tone RU. However, this embodiment of this application is not limited to being used in the 52-tone RU. The sequence provided in this application can be used in any IoT−STF that meets the size of 32-point IFFT. In other words, the IoT−S1 provided in this embodiment of this application can be used when the PSDU occupies a bandwidth of a 32-tone RU or a larger RU. This is not limited in this application.

Based on the short training sequence IoT-STF designed in this application, the receiving apparatus may implement a time synchronization function and an AGC adjustment function based on the IoT-STF sequence, to support the IoT device in implementing narrowband transmission.

An embodiment of this application further provides another sequence. In a possible implementation, the sequence values of the k subcarriers in frequency domain include sequence values IoT-S2$_{-26,26}$ of 53 subcarriers in frequency domain.

Specifically, the sequence values of the 53 subcarriers included in IoT-S2$_{-26,26}$ are a subset of the sequence values of the L-S1 in frequency domain.

In a possible implementation, the sequence values of the k subcarriers in frequency domain further include sequence values of 11 sideband subcarriers in frequency domain, the sequence values of the 11 sideband subcarriers are 0, and two ends of IoT-S2$_{-26,26}$ respectively include a1 sideband subcarriers in the 11 sideband subcarriers and b1 sideband subcarriers in the 11 sideband subcarriers, where a1 and b1 are positive integers, and a1+b1=11.

Specifically, the sequence values of the 11 sideband subcarriers serve as a guard spacing, thereby avoiding interference from the adjacent channels. The 11 sideband subcarriers and IoT-S2$_{-26,26}$ form a 64-point frequency domain sequence IoT-S2 in frequency domain. For example, a left end of the IoT-S2 may include sequence values of six sideband subcarriers, and a right end of the IoT-S2 includes sequence values of five sideband subcarriers. Alternatively, a left end of the IoT-S2 may include sequence values of five sideband subcarriers, and a right end of the IoT-S2 includes sequence values of six sideband subcarriers. Alternatively, another combination that meets the condition a1+b1=11 is used. This is not limited in this application. It should be noted that, after 64-point IFFT and a series of subsequent processing are performed on the IoT-S2, the IoT-S2 is sent on a narrowband channel less than 20 MHz.

In a possible implementation, IoT-S2$_{-26,26}$= $\sqrt{13/6}$ {0,0,1+j,0,0,0,−1−j,0,0,0,1+j,0,0,0,−1−j,0,0,0,−1 −j,0,0,0,1+j,0,0,0,0,0,0,−1−j,0,0,0,−1−j,0,0,0,1+j,0,0,0,1+ j,0,0,0,1+j,0,0,0,1+j,0,0}.

Specifically, IoT-S2$_{-26,26}$ is similar to S$_{-26,26}$ corresponding to Formula 1, that is, both IoT-S2$_{-26,26}$ and S$_{-26,26}$ have sequence values of 53 subcarriers. It should be noted that, two ends of the 53 subcarriers in IoT-S2$_{-26,26}$ respectively include a1 sideband subcarriers whose sequence values are 0 and b1 sideband subcarriers whose sequence values are 0, where a1 and b1 are positive integers and meet: a1+b1=11. The 11 sideband subcarriers whose values are 0 have a function similar to that of the 11 sideband subcarriers whose values are 0 in the L-S1, that is, serve as a guard spacing, thereby avoiding interference from the adjacent channels. The 11 sideband subcarriers and IoT-S2$_{-26,26}$ form a 64-point frequency domain sequence IoT-S2 in frequency domain. For example, a left end of IoT-S2$_{-26,26}$ further includes sequence values of six sideband subcarriers, and the six sequence values are all 0; and a right end of IoT-S2$_{-26,26}$ includes sequence values of five sideband subcarriers, and the five sequence values are also 0. In this way, the 64-point frequency domain sequence IoT-S2 can be obtained, so that 64-point IFFT can be performed.

It may be understood that, because IoT-S2$_{-26,26}$ is similar to S$_{-26,26}$ corresponding to Formula 1, after 64-point IFFT is performed on the IoT-S2, good synchronization performance and a good PAPR feature are also ensured. However, in time domain, the IoT-S2 includes four periodicities after IFFT is performed, and a CP whose length is 25% of the four periodicities is added, where a time domain symbol (represented by an IoT-s2) corresponding to each IoT-S2 includes five periodicities.

In an example, a time domain expression IoT-STF2 corresponding to the IoT-S2 may alternatively include N time domain symbols, where N is an integer greater than or equal to 1. It should be noted that an L-STF obtained after IFFT is performed on an entire L-S1 includes two time domain symbols. Therefore, the two time domain symbols include a total of 10 cyclic periodicities. If it is expected that the IoT-STF2 including the 10 cyclic periodicities is also obtained after IFFT is performed on the IoT-S2, and each IoT-s2 includes five periodicities, the IoT-s2 only needs to be repeated twice. In other words, the IoT-STF2 includes two time domain symbols, and an expression of the IoT-STF2 in time domain is shown in Formula 5:

IoT-STF2={IoT-s2,IoT-s2}    Formula 5

The IoT-STF2 represents the time domain expression corresponding to the IoT-S2, and the IoT-s2 represents a time domain symbol corresponding to each IoT-S2.

It may be understood that, the IoT-S2 and the IoT-STF2 form a function relationship, and a unique IoT-STF2 may be obtained based on the IoT-S2.

It can be learned that a PAPR feature corresponding to the IoT-STF2 provided in the foregoing embodiment is completely similar to the PAPR feature corresponding to the L-STF, and the IoT-STF2 and a time domain expression corresponding to the L-STF have a same periodicity feature. In addition, the IoT-STF2 also has features similar to those of the L-STF, namely, a good time synchronization feature and a good PAPR feature, and may provide a time synchronization function and an AGC adjustment function for an IoT data part transmitted in a narrowband.

It should be noted that, the IoT-S2 includes the sequence values of the 53 subcarriers and the sequence values of the 11 sideband subcarriers, so that 64-point IFFT can be performed. Therefore, when a bandwidth of IoT data part includes 64 subcarriers, and 64-point IFFT can be performed, the short training sequence can be obtained based on the values of the foregoing frequency domain sequence. For example, if the valid payload (namely, an IoT PSDU) in the IoT PPDU occupies a bandwidth of a 106-tone RU, where the 106-tone RU includes 106 subcarriers, a requirement of 64-point IFFT is met. Therefore, the sequence designed in this embodiment of this application can be used when the bandwidth is the 106-tone RU. However, the IoT-STF2 provided in this embodiment of this application is not limited to being used in the 106-tone RU. The sequence provided in this application can be used in any IoT-STF that meets the size of 64-point IFFT. In other words, the IoT-S2 provided in this embodiment of this application can be used when the IoT data part occupies a bandwidth of a 64-tone RU or a larger RU. This is not limited in this application.

An embodiment of this application provides still another sequence. The sequence values of the k subcarriers in frequency domain include sequence values IoT-S3$_{-6,6}$ of 13 subcarriers in frequency domain.

Specifically, the sequence values of the 13 subcarriers included in IoT-S3$_{-6,6}$ are a subset of the sequence values of the L-S1 in frequency domain.

In a possible implementation, the sequence values of the k subcarriers in frequency domain further include sequence values of three sideband subcarriers in frequency domain, the sequence values of the three sideband subcarriers are 0, and two ends of IoT-S3$_{-6,6}$ respectively include a2 sideband subcarriers in the three sideband subcarriers and b2 sideband subcarriers in the sideband subcarriers, where a2 and b2 are positive integers, and a2+b2=3.

Specifically, the three sideband subcarriers have a function similar to that of the 11 sideband subcarriers in the L-S1, that is, serve as a guard spacing, thereby avoiding interference from the adjacent channels. The three sideband subcarriers and IoT-S3$_{-6,6}$ form a 16-point frequency domain sequence IoT-S3 in frequency domain. It may be understood that, a left end of the IoT-S3 may include sequence values of two sideband subcarriers, and a right end of the IoT-S3 includes a sequence value of one sideband subcarrier. Alternatively, a left end of the IoT-S3 may include a sequence value of one sideband subcarrier, and a right end of the IoT-S3 includes sequence values of two sideband subcarriers. Therefore, after 16-point IFFT and a series of subsequent processing are performed on the corresponding IoT-S3, the IoT-S3 is sent on a narrowband channel far less than 20 MHz.

In a possible implementation, IoT-S3$_{-6,6}$= $\sqrt{13/6}$ {1+j,−1−j,1+j,−1−j,−1−j,1+j,0,−1−j,−1−j,1+j,1+j, 1+j,1+j}.

Specifically, IoT-S3$_{-6,6}$ is obtained by performing transform on S$_{-26,26}$ corresponding to Formula 1. Two sequence values whose values are 0 are removed from each of the first position and the last position at the two ends of S$_{-26,26}$. Sequence values between the first position and the last position are retained by removing, in a fixed spacing (that is, in a spacing of every one sequence value), three sequence values whose values are 0 and that appear cyclically. Sequence values of 13 subcarriers corresponding to IoT-S3$_{-6,6}$ can be obtained through the foregoing transform. It should be noted that, two ends of the 13 subcarriers in IoT-S3$_{-6,6}$ respectively include a2 sideband subcarriers whose sequence values are 0 and b2 sideband subcarriers whose sequence values are 0, where a2 and b2 are positive integers and meet: a2+b2=3. The three sideband subcarriers and IoT-S3$_{-6,6}$ form a 16-point frequency domain sequence IoT-S3 in frequency domain. For example, a left end of IoT-S3$_{-6,6}$ further includes sequence values of two sideband subcarriers, and the two sequence values are all 0; and a right end of IoT-S3$_{-6,6}$ includes a sequence value of one sideband subcarrier, and the sequence value is also 0. In this way, the 16-point frequency domain sequence IoT-S3 can be obtained, so that 16-point IFFT can be performed.

It may be understood that, because the IoT-S3 is obtained by removing, in the fixed spacing, some sequence values in S$_{-26,26}$ whose values are 0 and that appear cyclically, according to a property of Fourier transform, after 16-point IFFT is performed on the IoT-S3, a PAPR feature of the IoT-S3 is consistent with a PAPR feature corresponding to the L-STF. However, in time domain, the IoT-S3 corresponds to one periodicity after IFFT is performed, and a CP whose length is 25% of the periodicity is added, where a time domain symbol (represented by an IoT-s3) corresponding to each IoT-S3 includes 1.25 periodicities.

In an example, a time domain expression IoT-STF3 corresponding to the IoT-S3 may alternatively include N time domain symbols, where N is an integer greater than or equal to 1. It should be noted that an L-STF obtained after IFFT is performed on an entire L-S1 includes two time domain symbols. Therefore, the two time domain symbols include a total of 10 cyclic periodicities. If it is expected that the IoT-STF3 including the 10 cyclic periodicities is also obtained after IFFT is performed on the IoT-S3, and each IoT-s3 includes 1.25 periodicities, the IoT-s3 only needs to be repeated for eight times. In other words, the IoT-STF3 includes eight time domain symbols, and an expression of the IoT-STF3 is shown in Formula 6:

$$\text{IoT-STF3} = \{\text{IoT-}s3, \text{IoT-}s3, \text{IoT-}s3, \text{IoT-}s3, \text{IoT-}s3, \text{IoT-}s3, \text{IoT-}s3, \text{IoT-}s3\} \quad \text{Formula 6}$$

The IoT-STF3 represents the time domain expression corresponding to the IoT-S3, and the IoT-s3 represents a time domain symbol corresponding to each IoT-S3.

It may be understood that, the IoT-S3 and the IoT-STF3 form a function relationship, and a unique IoT-STF3 may be obtained based on the IoT-S3.

It can be learned that a PAPR feature corresponding to the IoT-STF3 provided in the foregoing embodiment is consistent with the PAPR feature corresponding to the L-STF, and the IoT-STF3 and the L-STF have a same periodicity feature. In addition, the IoT-STF3 also has features similar to those of the L-STF, namely, a good time synchronization feature and a good PAPR feature, and may provide a time synchronization function and an AGC adjustment function for an IoT data part transmitted in a narrowband.

It should be noted that, the IoT-S3 includes the sequence values of the 13 subcarriers and the sequence values of the three sideband subcarriers, so that 16-point IFFT can be performed. Therefore, when a bandwidth of the IoT data part includes 16 subcarriers, and 16-point IFFT can be performed, the short training sequence can be obtained based on the values of the foregoing frequency domain sequence. For example, if the valid payload (namely, an IoT PSDU) in the IoT PPDU occupies a bandwidth of a 26-tone RU, where the 26-tone RU includes 26 subcarriers, a requirement of 16-point IFFT is met. Therefore, the sequence designed in this embodiment of this application can be used when the bandwidth is the 26-tone RU. However, the IoT-S3 provided in this embodiment of this application is not limited to being used in the 26-tone RU. The sequence provided in this application can be used in any IoT-STF that meets the size of 16-point IFFT. In other words, the IoT-S3 provided in this embodiment of this application can be used when the IoT data part occupies a bandwidth of a 16-tone RU or a larger RU. This is not limited in this application.

According to this implementation, the short training sequence IoT-STF designed in this application may be used to provide a time synchronization function and an AGC adjustment function for a PPDU transmitted in a narrowband.

The sequence designed in this embodiment of this application may alternatively be used in uplink communication, that is, carried in an uplink PPDU. In other words, the sending apparatus may be a STA, and the receiving apparatus may be an AP. A STA-to-AP communication process corresponds to an uplink communication process.

Specifically, the station sends the PPDU to the AP, and synchronization adjustment indication information is used to perform time synchronization and AGC adjustment on a data field (namely, an IoT data part). The synchronization adjustment indication information may also be referred to as an internet of things short training sequence IoT-STF. It may be understood that the synchronization adjustment indication information may have another name in a specific standard. In this application, the IoT-STF is used for representation only for ease of subsequent description. This application is not limited thereto.

Specifically, an IoT device may send the PPDU to the AP after receiving an information request message sent by the AP, or may actively send the PPDU to the AP.

Further, because the IoT device operates in a narrowband, the IoT device needs to send the PPDU to the AP on a channel bandwidth far less than 20 MHz, for example, a bandwidth of 5 MHz.

It should be noted that the bandwidth in this application may be a resource unit of an orthogonal frequency division multiplexing (OFDM) format, or may be another frequency resource. This is not limited in this application.

In a possible format of the PPDU, an IoT-STF and another field of the IoT part are included. The IoT-STF is used to perform time synchronization and AGC adjustment on an IoT data part in the another field of the IoT part. The another field of the IoT part carries an IoT service.

Figure 7:
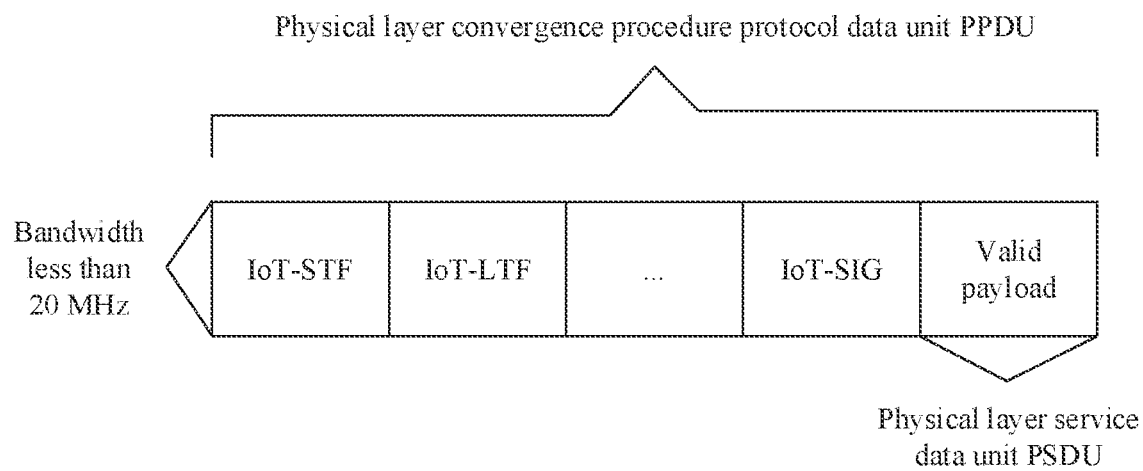
FIG. 7 is a schematic diagram of another IoT physical layer convergence procedure protocol data unit PPDU according to an embodiment of this application.

FIG. 7 shows another IoT physical layer convergence procedure protocol data unit PPDU according to an embodiment of this application. The IoT PPDU includes an IoT-STF, an IoT-LTF, an IoT-SIG, and an IoT data part, and the IoT-STF, the IoT-LTF, the IoT-SIG, and the IoT data part occupy a relatively small bandwidth. It should be noted that, the IoT-STF is used to perform time synchronization and AGC adjustment on a subsequent IoT data part (namely, an IoT PSDU). Specific functions and the like of another IoT part are not discussed in this application.

It should be noted that, for a specific design and a function of synchronization adjustment indication information, refer to the description of the method embodiment in FIG. 5. This method embodiment is similar to the method embodiment in FIG. 5. Therefore, details are not described herein again.

In addition, after receiving the PPDU sent by a station, an AP extracts the IoT-STF from the PPDU, and performs time synchronization and AGC adjustment on a narrowband PPDU transmitted in an IoT network.

According to this implementation, the short training sequence IoT-STF designed in this application may be used to provide a time synchronization function and an AGC adjustment function for the PPDU transmitted in the narrowband.

To better implement the foregoing solutions of the embodiments of this application, the following further correspondingly provides related apparatuses that are configured to cooperate to implement the foregoing solutions.

Figure 8:
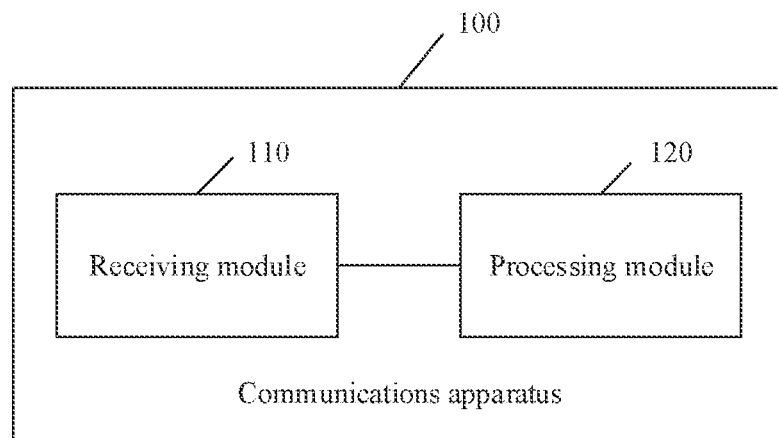
FIG. 8 is a schematic structural diagram of a communications apparatus according to an embodiment of this application.

FIG. 8 is a schematic structural diagram of a communications apparatus 100 according to an embodiment of this application. The communications apparatus 100 is a receiving apparatus, and includes at least a receiving module 110 and a processing module 120.

The receiving module 110 is configured to receive a physical layer convergence procedure protocol data unit PPDU sent by a sending apparatus, where the PPDU includes synchronization adjustment indication information and a data field, and the synchronization adjustment indication information and the data field are sent in a bandwidth less than 20 MHz.

The processing module 120 is configured to perform time synchronization and automatic gain control AGC on the data field based on the synchronization adjustment indication information.

It should be noted that, for the PPDU received by the receiving module 110 in the communications apparatus 100 in this embodiment of this application, correspondingly refer to specific implementations of the PPDU in the foregoing method embodiments. Details are not described herein again.

It may be understood that, in uplink communication, the apparatus 100 may be an apparatus on an access point AP side, or a chip in an access point AP, to support the access point AP in implementing a corresponding function in the foregoing methods. In downlink communication, the apparatus 100 may be an apparatus on a station STA side, or a chip in a station STA, to support the STA in implementing a corresponding function in the foregoing methods.

Figure 9:
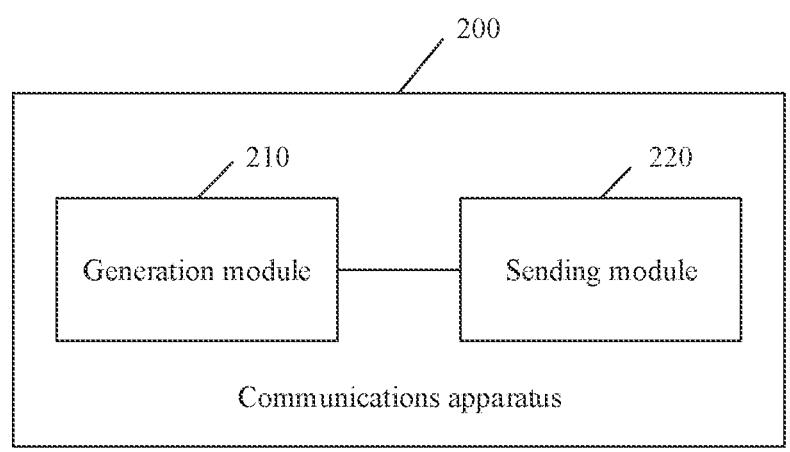
FIG. 9 is a schematic structural diagram of another communications apparatus according to an embodiment of this application.

FIG. 9 is a schematic structural diagram of another communications apparatus 200 according to an embodiment of this application. The communications apparatus 200 is a sending apparatus, and includes at least a generation module 210 and a sending module 220.

The generation module 210 is configured to generate a PPDU, where the PPDU includes synchronization adjustment indication information and a data field.

The sending module 220 is configured to send the synchronization adjustment indication information and the data field in a bandwidth less than 20 MHz, where the synchronization adjustment indication information is used by a receiving apparatus to perform time synchronization and automatic gain control AGC on the data field.

It should be noted that, for the PPDU generated by the generation module 210 in the communications apparatus 200 in this embodiment of this application, correspondingly refer to specific implementations of the PPDU in the foregoing method embodiments. Details are not described herein again.

It may be understood that, in downlink communication, the apparatus 200 may be an apparatus on an access point AP side, or a chip in an access point AP. In uplink communication, the apparatus 200 may be an apparatus on a station STA side, or a chip in a station STA.

According to this implementation, time synchronization and AGC adjustment can be supported on an IoT data part in a bandwidth less than 20 MHz.

Figure 10:
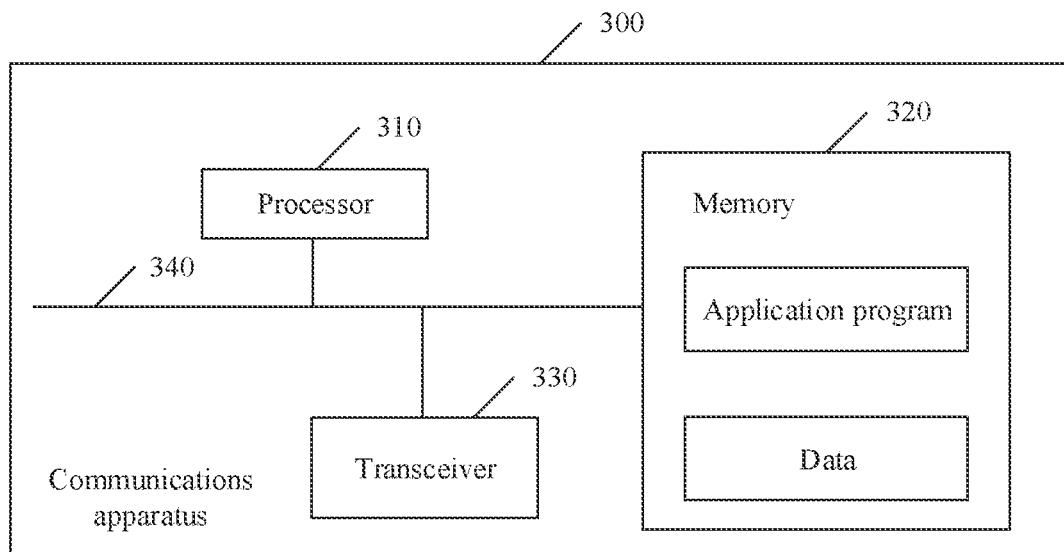
FIG. 10 is a schematic structural diagram of another communications apparatus according to an embodiment of this application.

FIG. 10 shows another communications apparatus 300 according to an embodiment of this application. The communications apparatus 300 is a receiving apparatus, and includes at least a processor 310, a memory 320, and a transceiver 330. The processor 310, the memory 320, and the transceiver 330 are connected to each other by using a bus 340.

The memory 320 includes but is not limited to a random access memory (Random Access Memory, RAM), a read-only memory (ROM), an erasable programmable read-only memory (EPROM), or a flash memory. The memory 320 is configured to store a related instruction and data.

The transceiver 330 such as a radio frequency module may include a receiver and a transmitter. That the processor 310 receives or sends a message described below may be specifically understood as that the processor 310 receives or sends a message through the transceiver 330.

The processor 310 may be one or more central processing units (CPU). When the processor 310 is one CPU, the CPU may be a single-core CPU, or may be a multi-core CPU.

The processor 310 in the communications apparatus 300 is configured to read program code stored in the memory 320, to perform the following operations.

The processor 310 receives, through the transceiver 330, a PPDU sent by a sending apparatus, where the PPDU includes synchronization adjustment indication information and a data field, and the synchronization adjustment indication information and the data field are sent in a bandwidth less than 20 MHz.

The processor 310 performs time synchronization and automatic gain control AGC on the data field based on the synchronization adjustment indication information.

It should be noted that a manner in which the receiving apparatus 300 receives the PPDU and a specific design of the PPDU may alternatively be specifically implemented according to a method in the foregoing method embodiments. Details are not described herein again.

It may be understood that, in uplink communication, the apparatus 300 may be an apparatus on an access point AP side, or a chip in an access point AP. In downlink communication, the apparatus 300 may be an apparatus on a station STA side, or a chip in a station STA.

According to this implementation, time synchronization and AGC adjustment can be performed on an IoT data part in a bandwidth less than 20 MHz.

Figure 11:
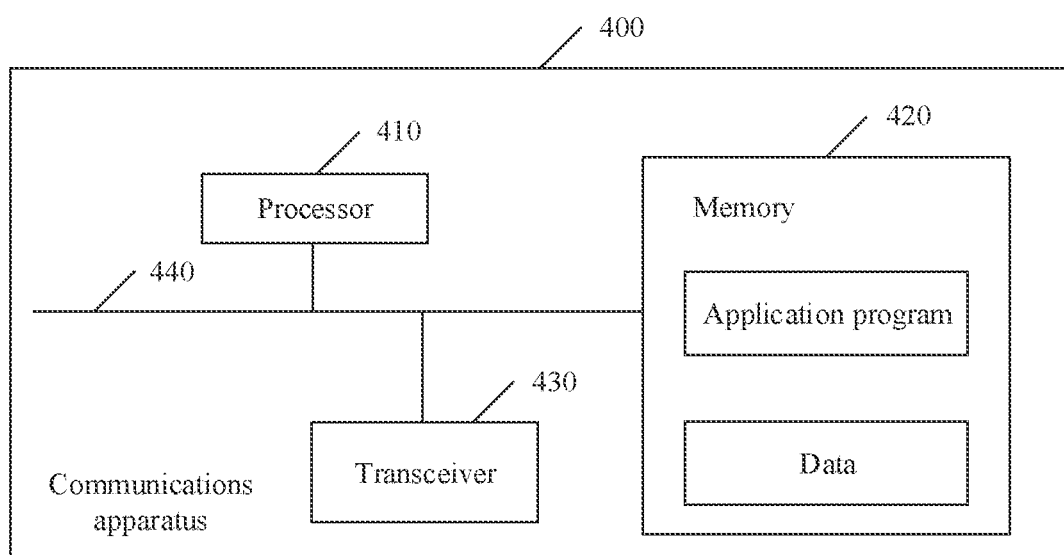
FIG. 11 is a schematic structural diagram of another communications apparatus according to an embodiment of this application.

FIG. 11 shows another communications apparatus 400 according to an embodiment of this application. The communications apparatus 400 is a sending apparatus, and includes at least a processor 410, a memory 420, and a transceiver 430. The processor 410, the memory 420, and the transceiver 430 are connected to each other by using a bus 440.

The memory 420 includes but is not limited to a random access memory (RAM), a read-only memory (ROM), an erasable programmable read-only memory (EPROM), or a flash memory. The memory 420 is configured to store a related instruction and data.

The transceiver 430 such as a radio frequency module may include a receiver and a transmitter. That the processor 410 receives or sends a message described below may be specifically understood as that the processor 410 receives or sends a message through the transceiver 430.

The processor 410 may be one or more central processing units (CPU). When the processor 410 is one CPU, the CPU may be a single-core CPU, or may be a multi-core CPU.

The processor 410 in the communications apparatus 400 is configured to read program code stored in the memory 420, to perform the following operations.

The processor 410 generates a PPDU, where the PPDU includes synchronization adjustment indication information and a data field.

The processor 410 sends the synchronization adjustment indication information and the data field through the transceiver 430 in a bandwidth less than 20 MHz, where the synchronization adjustment indication information is used by a receiving apparatus to perform time synchronization and automatic gain control AGC on the data field.

It should be noted that a manner in which the sending apparatus 400 sends the PPDU and a specific design of the PPDU may alternatively be specifically implemented according to a method in the foregoing method embodiments. Details are not described herein again.

It may be understood that, in downlink communication, the apparatus 400 may be an apparatus on an access point AP side, or a chip in an access point AP. In uplink communication, the apparatus 400 may be an apparatus on a station STA side, or a chip in a station STA.

According to this implementation, time synchronization and AGC adjustment can be supported on an IoT data part in a bandwidth less than 20 MHz.

An embodiment of this application further provides a computer-readable storage medium. The computer-readable storage medium stores an instruction, and when the instruction is run on a computer or a processor, the computer or the processor is enabled to perform one or more steps in any one of the foregoing physical layer convergence procedure protocol data unit communication methods. When component modules of the apparatus are implemented in a form of a software functional unit and sold or used as an independent product, the component modules may be stored in the computer-readable storage medium.

The computer-readable storage medium may be an internal storage unit of the communications apparatus described in any one of the foregoing embodiments, for example, a hard disk or a memory of the communications apparatus. The computer-readable storage medium may alternatively be an external storage device of the communications apparatus, for example, a removable hard disk, a smart media card (SMC), a secure digital (SD) card, a flash card, and the like that are configured on the communications apparatus. Further, the computer-readable storage medium may alternatively include both an internal storage unit and an external storage device of the foregoing communications apparatus. The computer-readable storage medium is configured to store the computer program and other programs and data that are required by the communications apparatus. The computer-readable storage medium may be further configured to temporarily store data that has been output or is to be output.

A person of ordinary skill in the art may understand that all or some of the processes of the methods in the embodiments may be implemented by a computer program instructing relevant hardware. The program may be stored in a computer-readable storage medium. When the program runs, the processes of the method embodiments are included. The foregoing storage medium includes any medium that can store program code, such as a ROM, a RAM, a magnetic disk, or an optical disc.

A sequence of steps of a method in the embodiments of this application may be adjusted, combined, or deleted based on an actual requirement.

Modules in an apparatus in the embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, a person of ordinary skill in the art should understand that the technical solutions described in the foregoing embodiments may still be modified, or some technical features in the technical solutions may be equivalently replaced. These modifications or replacements do not make the essence of the corresponding technical solutions fall outside the scope of the technical solutions of the embodiments of this application.

What is claimed is:

1. A communications apparatus, comprising:
    a memory storing instructions; and
    a processor coupled to the memory, wherein the instructions, when executed by the processor, cause the communications apparatus to:
    receive a physical layer convergence procedure protocol data unit (PPDU) sent by a sending apparatus, wherein the PPDU comprises synchronization adjustment indication information and a data field, and the synchronization adjustment indication information and the data field are sent in a bandwidth less than 20 MHz; and
    perform time synchronization and automatic gain control (AGC) on the data field based on the synchronization adjustment indication information; and
    wherein the bandwidth less than 20 MHz comprises k subcarriers in a frequency domain, the synchronization adjustment indication information comprises information obtained after inverse fast Fourier transform (IFFT) is performed on sequence values of the k subcarriers in the frequency domain, and the sequence values of the k subcarriers are a subset of sequence values of a legacy short training sequence (L-STF) in a legacy preamble (L-preamble) in the frequency domain.

2. The communications apparatus according to claim 1, wherein the sequence values of the k subcarriers in the frequency domain comprise sequence values of 27 subcarriers in the frequency domain, the sequence values of the 27 subcarriers represented as $IoT\text{-}S1_{-13,13}$.

3. The communications apparatus according to claim 2, wherein the sequence values of the k subcarriers in the frequency domain further comprise sequence values of five sideband subcarriers in the frequency domain, the sequence values of the five sideband subcarriers are 0, and two ends of $IoT\text{-}S1_{-13,13}$ respectively comprise sequence values of A sideband subcarriers in the five sideband subcarriers and sequence values of B sideband subcarriers in the five sideband subcarriers, wherein A and B are positive integers, and A+B=5.

4. The communications apparatus according to claim 3, wherein $IoT\text{-}S1_{-13,13}=$ $\sqrt{13/6}\{0,1+j,0,-1-j,0,1+j,0,-1-j,0,-1-j,0,1+j,0,0,0,-1-j,0,-1-j,0,1+j,0,1+j,0,1+j,0,1+j,0\}$.

5. The communications apparatus according to claim 4, wherein $IoT\text{-}S1_{-13,13}=$ $\sqrt{13/6}\{0,-1-j,0,0,0,-1-j,0,0,0,1+j,0,0,0,0,0,0,0,-1-j,0,0,0,-1-j,0,0,0,1+j,0\}$.

6. The communications apparatus according to claim 1, wherein the bandwidth less than 20 MHz comprises k subcarriers in a frequency domain, the synchronization adjustment indication information comprises information obtained after IFFT is performed on sequence values of the k subcarriers in the frequency domain, the sequence values of the k subcarriers in the frequency domain comprise a set of sequence values represented as $IoT\text{-}S1_{-13,13}$, and $IoT\text{-}S1_{-13,13}$ is one of following sequences:
$\sqrt{13/6}\{0,1+j,0,0,0,1+j,0,0,0,-1-j,0,0,0,0,0,0,0,-1-j,0,0,0,1+j,0,0,0,-1-j,0\}$;
$\sqrt{13/6}\{0,1+j,0,0,0,-1-j,0,0,0,1+j,0,0,0,0,0,0,0,1+j,0,0,0,-1-j,0,0,0,-1-j,0\}$;
$\sqrt{13/6}\{0,1+j,0,0,0,-1-j,0,0,0,1+j,0,0,0,0,0,0,0,-1-j,0,0,0,-1-j,0,0,0,1+j,0\}$;
$\sqrt{13/6}\{0,1+j,0,0,0,-1-j,0,0,0,-1-j,0,0,0,0,0,0,0,1+j,0,0,0,-1-j,0,0,0,1+j,0\}$;
$\sqrt{13/6}\{0,-1-j,0,0,0,1+j,0,0,0,1+j,0,0,0,0,0,0,0,-1-j,0,0,0,1+j,0,0,0,-1-j,0\}$;
$\sqrt{13/6}\{0,-1-j,0,0,0,1+j,0,0,0,-1-j,0,0,0,0,0,0,0,1+j,0,0,0,1+j,0,0,0,-1-j,0\}$;
$\sqrt{13/6}\{0,-1-j,0,0,0,1+j,0,0,0,-1-j,0,0,0,0,0,0,0,-1-j,0,0,0,1+j,0,0,0,1+j,0\}$; or
$\sqrt{13/6}\{0,-1-j,0,0,0,-1-j,0,0,0,1+j,0,0,0,0,0,0,0,1+j,0,0,0,-1-j,0,0,0,1+j,0\}$.

7. The communications apparatus according to claim 1, wherein the sequence values of the k subcarriers in the frequency domain comprise sequence values of 53 subcarriers in the frequency domain, the sequence values of the 53 subcarriers represented as $IOT\text{-}S2_{-26,26}$.

8. The communications apparatus according to claim 7, wherein the sequence values of the k subcarriers in the frequency domain further comprise sequence values of eleven sideband subcarriers in the frequency domain, the sequence values of the eleven sideband subcarriers are 0, and two ends of $IOT\text{-}S2_{-26,26}$ respectively comprise sequence values of a1 sideband subcarriers in the eleven sideband subcarriers and sequence values of b1 sideband subcarriers in the eleven sideband subcarriers, wherein a1 and b1 are positive integers, and a1+b1=11.

9. The communications apparatus according to claim 8, wherein $IOT\text{-}S2_{-26,26}=$ $\sqrt{13/6}\{0,0,1\pm j,0,0,0,-1-j,0,0,0,1\pm j,0,0,0,-1-j,0,0,0,-1-j,0,0,0,1\pm j,0,0,0,0,0,0,0,-1-j,0,0,0,-1-j,0,0,0,1\pm j,0,0,0,1\pm j,0,0,0,1\pm j,0,0\}$.

10. The communications apparatus according to claim 1, wherein the sequence values of the k subcarriers in the frequency domain comprise sequence values of 13 subcarriers in the frequency domain, the sequence values of the 13 subcarriers represented as $IOT\text{-}S2_{-6,6}$.

11. The communications apparatus according to claim 10, wherein the sequence values of the k subcarriers in the frequency domain further comprise sequence values of three sideband subcarriers in the frequency domain, the sequence values of the three sideband subcarriers are 0, and two ends of $IoT\text{-}S3_{-6,6}$ respectively comprise sequence values of a2 sideband subcarriers in the three sideband subcarriers and sequence values of b2 sideband subcarriers in the three sideband subcarriers, wherein a2 and b2 are positive integers, and a2+b2=3.

12. The communications apparatus according to claim 11, wherein $IoT\text{-}S3_{-6,6}=$ $\sqrt{13/6}\{1+j,-1-j,1+j,-1-j,-1-j,1+j,0,-1-j,-1-j,1+j,1+j,1+j,1+j\}$.

13. The communications apparatus according to claim 1, wherein the PPDU further comprises the legacy preamble (L-preamble), and the L-preamble is sent in a bandwidth in a unit of 20 MHz.

14. A communications apparatus, comprising:
a memory storing instructions; and
a processor coupled to the memory, wherein the instructions to, when executed by the processor, cause the communications apparatus to:
generate a physical layer convergence procedure protocol data unit (PPDU), wherein the PPDU comprises synchronization adjustment indication information and a data field; and
send the PPDU to a receiving apparatus, wherein the synchronization adjustment indication information and the data field are sent in a bandwidth less than 20 MHz, and the synchronization adjustment indication information enables the receiving apparatus to perform time synchronization and automatic gain control (AGC) on the data field based on the synchronization adjustment indication information; and
wherein the bandwidth less than 20 MHz comprises k subcarriers in a frequency domain, the synchronization adjustment indication information comprises information obtained after inverse fast Fourier transform (IFFT) is performed on sequence values of the k subcarriers in the frequency domain, and the sequence values of the k subcarriers are a subset of sequence values of a legacy short training sequence (L-STF) in a legacy preamble (L-preamble) in the frequency domain.

15. The communications apparatus according to claim 14, wherein the sequence values of the k subcarriers in the frequency domain comprise sequence values of 27 subcarriers in the frequency domain, the sequence values of the 27 subcarriers represented as $IoT\text{-}S1_{-13,13}$.

16. The communications apparatus according to claim 15, wherein the sequence values of the k subcarriers in the frequency domain further comprise sequence values of five sideband subcarriers in the frequency domain, the sequence values of the five sideband subcarriers are 0, and two ends of $IoT\text{-}S1_{-13,13}$ respectively comprise sequence values of A sideband subcarriers in the five sideband subcarriers and sequence values of B sideband subcarriers in the five sideband subcarriers, wherein A and B are positive integers, and A+B=5.

17. The communications apparatus according to claim 16, wherein IoT−S1$_{−13,13}$= $\sqrt{13/6}$ {0,1+j,0,−1−j,0,1+j,0,−1−j,0,−1−j,0,1+j,0,0,0, −1−j,0,−1−j,0,1+j,0,1+j,0,1+j,0}.

18. The communications apparatus according to claim 16, wherein IoT−S1$_{−13,13}$= $\sqrt{13/6}$ {0,−1−j,0,0,0,−1−j,0,0,0,1+j,0,0,0,0,0,0,0,−1−j,0, 0,0,−1−j,0,0,0,1+j,0}.

19. The communications apparatus according to claim 14, wherein the bandwidth less than 20 MHz comprises k subcarriers in a frequency domain, the synchronization adjustment indication information comprises information obtained after IFFT is performed on sequence values of the k subcarriers in the frequency domain, the sequence values of the k subcarriers in the frequency domain comprise a set of sequence values represented as IoT−S1$_{−13,13}$, and IoT−S1$_{−13,13}$ is one of following sequences:
$\sqrt{13/6}$ {0,1+j,0,0,0,1+j,0,0,0,−1−j,0,0,0,0,0,0,0,−1−j,0,0,0, 1+j,0,0,0,−1−j,0};
$\sqrt{13/6}$ {0,1+j,0,0,0,−1−j,0,0,0,1+j,0,0,0,0,0,0,0,1+j,0,0,0, −1−j,0,0,0,−1−j,0};
$\sqrt{13/6}$ {0,1+j,0,0,0,−1−j,0,0,0,1+j,0,0,0,0,0,0,0,−1−j,0,0,0, −1−j,0,0,0,1+j,0};
$\sqrt{13/6}$ {0,1+j,0,0,0,−1−j,0,0,0,−1−j,0,0,0,0,0,0,0,1+j,0,0,0, −1−j,0,0,0,1+j,0};
$\sqrt{13/6}$ {0,−1−j,0,0,0,1+j,0,0,0,1+j,0,0,0,0,0,0,0,−1−j,0, 0,0,1+j,0,0,0,−1−j,0};
$\sqrt{13/6}$ {0,−1−j,0,0,0,1+j,0,0,0,−1−j,0,0,0,0,0,0,0,1+j,0, 0,0,1+j,0,0,0,−1−j,0};
$\sqrt{13/6}$ {0,−1−j,0,0,0,1+j,0,0,0,−1−j,0,0,0,0,0,0,0,−1−j,0,0, 0,1+j,0,0,0,1+j,0}; or
$\sqrt{13/6}$ {0,−1−j,0,0,0,−1−j,0,0,0,1+j,0,0,0,0,0,0,0,1+j,0, 0,0,−1−j,0,0,0,1+j,0}.

20. The communications apparatus according to claim 14, wherein the sequence values of the k subcarriers in the frequency domain comprise sequence values of 53 subcarriers in the frequency domain, the sequence values of the 53 subcarriers represented as IoT−S2$_{−26,26}$.

21. The communications apparatus according to claim 20, wherein the sequence values of the k subcarriers in the frequency domain further comprise sequence values of eleven sideband subcarriers in the frequency domain, the sequence values of the eleven sideband subcarriers are 0, and two ends of IoT−S2$_{−26,26}$ respectively comprise sequence values of a1 sideband subcarriers in the eleven sideband subcarriers and sequence values of b1 sideband subcarriers in the eleven sideband subcarriers, wherein a1 and b1 are positive integers, and a1+b1=11.

22. The communications apparatus according to claim 21, wherein IoT−S2$_{−26,26}$= $\sqrt{13/6}$ {0,0,1±j,0,0,0,−1−j,0,0,0,1±j,0,0,0,−1,0,0,0,−1 −j,0,0,0,1±j,0,0,0,0,0,0,0,−1−j,0,0,0,−1−j,0,0,0,1±j,0,0,0, 1±j,0,0,0,1±j,0,0,0,1±j,0,0}.

23. The communications apparatus according to claim 14, wherein the sequence values of the k subcarriers in the frequency domain comprise sequence values of 13 subcarriers in the frequency domain, the sequence values of the 13 subcarriers represented as IoT−S3$_{−6,6}$.

24. The communications apparatus according to claim 23, wherein the sequence values of the k subcarriers in the frequency domain further comprise sequence values of three sideband subcarriers in the frequency domain, the sequence values of the three sideband subcarriers are 0, and two ends of IoT−S3$_{−6,6}$ respectively comprise sequence values of a2 sideband subcarriers in the three sideband subcarriers and sequence values of b2 sideband subcarriers in the three sideband subcarriers, wherein a2 and b2 are positive integers, and a2+b2=3.

25. The communications apparatus according to claim 24, wherein IoT−S3$_{−6,6}$= $\sqrt{13/6}$ {1+j,−1−j,1+j,−1−j,−1−j,1+j,0,−1−j,−1−j,1+1,1+ j,1+j,1+j}.

26. The communications apparatus according to claim 14, wherein the PPDU further comprises the legacy preamble (L-preamble), and the L-preamble is sent in a bandwidth in a unit of 20 MHz.

27. A method comprising:
receiving, by a receiving apparatus, a physical layer convergence procedure protocol data unit (PPDU) sent by a sending apparatus, wherein the PPDU comprises synchronization adjustment indication information and a data field, and the synchronization adjustment indication information and the data field are sent in a bandwidth less than 20 MHz; and
performing, by the receiving apparatus, time synchronization and automatic gain control (AGC) on the data field based on the synchronization adjustment indication information; and
wherein the bandwidth less than 20 MHz comprises k subcarriers in a frequency domain, the synchronization adjustment indication information comprises information obtained after inverse fast Fourier transform (IFFT) is performed on sequence values of the k subcarriers in the frequency domain, and the sequence values of the k subcarriers are a subset of sequence values of a legacy short training sequence (L-STF) in a legacy preamble (L-preamble) in the frequency domain.

28. A method comprising:
sending, by a sending apparatus, a physical layer convergence procedure protocol data unit (PPDU) to a receiving apparatus, wherein the PPDU comprises synchronization adjustment indication information and a data field, and the synchronization adjustment indication information and the data field are sent in a bandwidth less than 20 MHz, wherein
the synchronization adjustment indication information enables the receiving apparatus to perform time synchronization and automatic gain control (AGC) on the data field based on the synchronization adjustment indication information; and
wherein the bandwidth less than 20 MHz comprises k subcarriers in a frequency domain, the synchronization adjustment indication information comprises information obtained after inverse fast Fourier transform (IFFT) is performed on sequence values of the k subcarriers in the frequency domain, and the sequence values of the k subcarriers are a subset of sequence values of a legacy short training sequence (L-STF) in a legacy preamble (L-preamble) in the frequency domain.

* * * * *

UNITED STATES PATENT AND TRADEMARK OFFICE
CERTIFICATE OF CORRECTION

PATENT NO. : 11,438,204 B2
APPLICATION NO. : 17/164185
DATED : September 6, 2022
INVENTOR(S) : Ming Gan It is certified that error appears in the above-identified patent and that said Letters Patent is hereby corrected as shown below:

In the Claims

Claim 7, Column 29, Line 57; delete "IOT" and insert --IoT--.

Claim 8, Column 29, Line 63; delete "IOT" and insert --IoT--.

Claim 9, Column 30, Lines 2-5; delete
"wherein $IOT\text{-}S2_{-26,26}=\sqrt{13/6}\{0,0,1\pm j,0,0,0,-1-j,0,0,0,1\pm j,0,0,0,-1-j,0,0,0,-1-j,0,0,0,1\pm j,0,0,0,0,0,0,-1-j,0,0,0,-1-j,0,0,0,1\pm j,0,0,0,1\pm j,0,0,0,1\pm j,0,0\}$." and insert
-- $IoT - S2_{-26,26}=\sqrt{13/6}\{0,0,1+j,0,0,0,-1-j,0,0,0,1+j,0,0,0,-1-j,0,0,0,-1-j,0,0,0,1+j,0,0,0,0,0,0,-1-j,0,0,0,-1-j,0,0,0,1+j,0,0,0,1+j,0,0,0,1+j,0,0,0,1+j,0,0\}$. --.

Claim 10, Column 30, Line 10; delete "IOT" and insert --IoT--.

Claim 12, Column 30, Line 21; delete "IOT" and insert --IoT--.

Claim 22, Column 31, Lines 53-56; delete
"wherein $IoT\text{-}S2_{-26,26}=\sqrt{13/6}\{0,0,1\pm j,0,0,0,-1-j,0,0,0,1\pm j,0,0,0,-1,0,0,0,-1-j,0,0,0,1\pm j,0,0,0,0,0,0,-1-j,0,0,0,-1-j,0,0,0,1\pm j,0,0,0,1\pm j,0,0,0,1\pm j,0,0\}$." and insert
-- wherein $IoT - S2_{-26,26}=\sqrt{13/6}\{0,0,1+j,0,0,0,-1-j,0,0,0,1+j,0,0,0,-1-j,0,0,0,-1-j,0,0,0,1+j,0,0,0,0,0,0,-1-j,0,0,0,-1-j,0,0,0,1+j,0,0,0,1+j,0,0,0,1+j,0,0\}$. --.

Signed and Sealed this
Eleventh Day of October, 2022

*Katherine Kelly Vidal*
*Director of the United States Patent and Trademark Office*

CERTIFICATE OF CORRECTION (continued)
U.S. Pat. No. 11,438,204 B2

Claim 25, Column 32, Lines 9-11; delete "wherein $IoT-S3_{-6,6}=\sqrt{13/6}\{1+j,-1-j,1+j,-1-j,-1-j,1+j,0,-1-j,-1-j,1+1,1+j,1+j,1+j\}.$" and insert -- wherein $IoT-S3_{-6,6}=\sqrt{13/6}\{1+j,-1-j,1+j,-1-j,-1-j,1+j,0,-1-j,-1-j,1+j,1+j,1+j,1+j\}.$ --.